US012664589B2

(12) United States Patent
Wu et al.

(10) Patent No.: US 12,664,589 B2
(45) Date of Patent: Jun. 23, 2026

(54) FINANCIAL INVESTMENT PREDICTIONS

(71) Applicant: NVIDIA Corporation, Santa Clara, CA (US)

(72) Inventors: Xianchao Wu, Tokyo (JP); Yi Dong, Lexington, MA (US); Scott Nunweiler, Yokohama (JP)

(73) Assignee: NVIDIA Corporation, Santa Clara, CA (US)

( * ) Notice: Subject to any disclaimer, the term of this patent is extended or adjusted under 35 U.S.C. 154(b) by 431 days.

(21) Appl. No.: 18/051,206

(22) Filed: Oct. 31, 2022

(65) Prior Publication Data

US 2024/0144373 A1     May 2, 2024

(51) Int. Cl.
G06Q 40/06     (2012.01)
G06N 3/08     (2023.01)

(52) U.S. Cl.
CPC .............. G06Q 40/06 (2013.01); G06N 3/08 (2013.01)

(58) Field of Classification Search
CPC ................................................. G06F 16/3329
USPC ........................ 705/35, 36, 36 R, 37; 706/21
See application file for complete search history.

(56) References Cited

U.S. PATENT DOCUMENTS

| 11,915,123 B2 * | 2/2024 | Dang .................... G06F 40/284 |
| 2011/0137822 A1 * | 6/2011 | Chapman ................ G06T 11/26 |
| | | 705/36 R |
| 2013/0138577 A1 | 5/2013 | Sisk |

| 2019/0228015 A1 * | 7/2019 | Assia ..................... G06Q 50/01 |
| 2019/0236450 A1 * | 8/2019 | Li ........................... G06N 3/045 |
| 2019/0251626 A1 * | 8/2019 | Jezewski ................ G06Q 40/06 |
| 2019/0325524 A1 | 10/2019 | Gebara et al. |
| 2021/0049700 A1 * | 2/2021 | Nguyen ................ G06N 3/044 |
| 2021/0056168 A1 * | 2/2021 | Bull ...................... G06F 40/211 |
| 2021/0174449 A1 | 6/2021 | Thomas |
| 2021/0224683 A1 * | 7/2021 | Price ..................... G06N 20/00 |
| 2021/0264520 A1 | 8/2021 | Cummings |
| 2021/0272040 A1 * | 9/2021 | Johnson ................ G06N 5/022 |
| 2021/0357772 A1 * | 11/2021 | Egorov ................ G06F 16/258 |
| 2021/0397941 A1 | 12/2021 | Zhu et al. |
| 2022/0068274 A1 * | 3/2022 | D'Alessandro .... G06Q 30/0207 |
| 2022/0092697 A1 * | 3/2022 | Ma ......................... G06N 3/088 |

(Continued)

OTHER PUBLICATIONS

Hu, "Listening to Chaotic Whispers: A Deep Learning Framework for News-oriented Stock Trend Prediction", https://arxiv.org/pdf/1712.02136 , 2019 (Year: 2019).*

(Continued)

*Primary Examiner* — Matthew S Gart
*Assistant Examiner* — Mark A Malkowski
(74) *Attorney, Agent, or Firm* — IRON SUMMIT IP LLP

(57) ABSTRACT

In various examples, interactive systems that use neural networks to determine financial investment predictions or recommendations are presented. Systems and methods are disclosed that determine financial predictions or recommendations associated with one or more investments using a neural network(s). The financial predictions may include a predicted movement of an investment (e.g., extremely down, down, preserved, up, extremely up, etc.), a predicted price of an investment (e.g., a future stock price, etc.), a specific investment for a user to buy/sell/trade, and/or so forth. In some examples, the systems and methods may include an interactive system(s), such as a dialogue system(s), that interacts with users to provide the financial predictions.

20 Claims, 16 Drawing Sheets

(56) References Cited

U.S. PATENT DOCUMENTS

| | | | |
|---|---|---|---|
| 2022/0121921 A1* | 4/2022 | Chen | G06Q 10/10 |
| 2022/0156594 A1* | 5/2022 | Hoang | G06N 3/088 |
| 2022/0207336 A1* | 6/2022 | Kim | G06N 3/063 |
| 2022/0327430 A1 | 10/2022 | Zuberi et al. | |
| 2022/0358594 A1* | 11/2022 | Zhu | G06N 20/00 |
| 2023/0409970 A1* | 12/2023 | Trehan | G06N 20/00 |
| 2023/0410205 A1 | 12/2023 | Bijral et al. | |
| 2024/0144372 A1 | 5/2024 | Wu et al. | |
| 2024/0144373 A1 | 5/2024 | Wu et al. | |
| 2024/0311404 A1* | 9/2024 | Hurwitz | G06F 16/3329 |

OTHER PUBLICATIONS

Li, "A Multimodal Event-driven LSTM Model for Stock Prediction Using Online News", https://www.researchgate.net/publication/338783254_A_Multimodal_Event-driven_LSTM_Model_for_Stock_Prediction_Using_Online_News , 2020 (Year: 2020).*
Dolphin et. al, "Stock Embeddings: Learning Distributed Representations for Financial Assets" https://arxiv.org/pdf/2202.08968—Arxiv—Feb. 14, 2022 (Year: 2022).*
Dang, ""The Squawk Bot"*: Joint Learning of Time Series and Text Data Modalities for https://arxiv.org/abs/1912.10858 Automated Financial Information Filtering", (Year: 2019).*
Akita, "Deep Learning for Stock Prediction Using Numerical and Textual Information" (Year: 2016).*
Xinyi Li, "DP-LSTM: Differential Privacy-inspired LSTM for Stock Prediction Using Financial News" https://arxiv.org/pdf/1912.10806 (Year: 2019).*
Minh, "Deep Learning Approach for Short-Term Stock Trends Prediction Based on Two-Stream Gated Recurrent Unit Network", https://ieeexplore.ieee.org/document/8456512 (Year: 2018).*
Wu, Xianchao; Non-Final Office Action for U.S. Appl. No. 18/051,156, filed Oct. 31, 2022, mailed Oct. 10, 2024, 22 pgs.
Wu, Xianchao; Final Office Action for U.S. Appl. No. 18/051,156, filed Oct. 31, 2022, mailed Jan. 30, 2025, 34 pgs.
Wu, Xianchao; Advisory Action for U.S. Appl. No. 18/051,156, filed Oct. 31, 2022, mailed Mar. 25, 2025, 3 pgs.
Wu, Xianchao; Final Office Action for U.S. Appl. No. 18/051,156, filed Oct. 31, 2022, mailed Oct. 2, 2025, 24 pgs.
Wu, Xianchao; Non-Final Office Action for U.S. Appl. No. 18/051,156, filed Oct. 31, 2022, mailed May 9, 2025, 35 pgs.

* cited by examiner

210

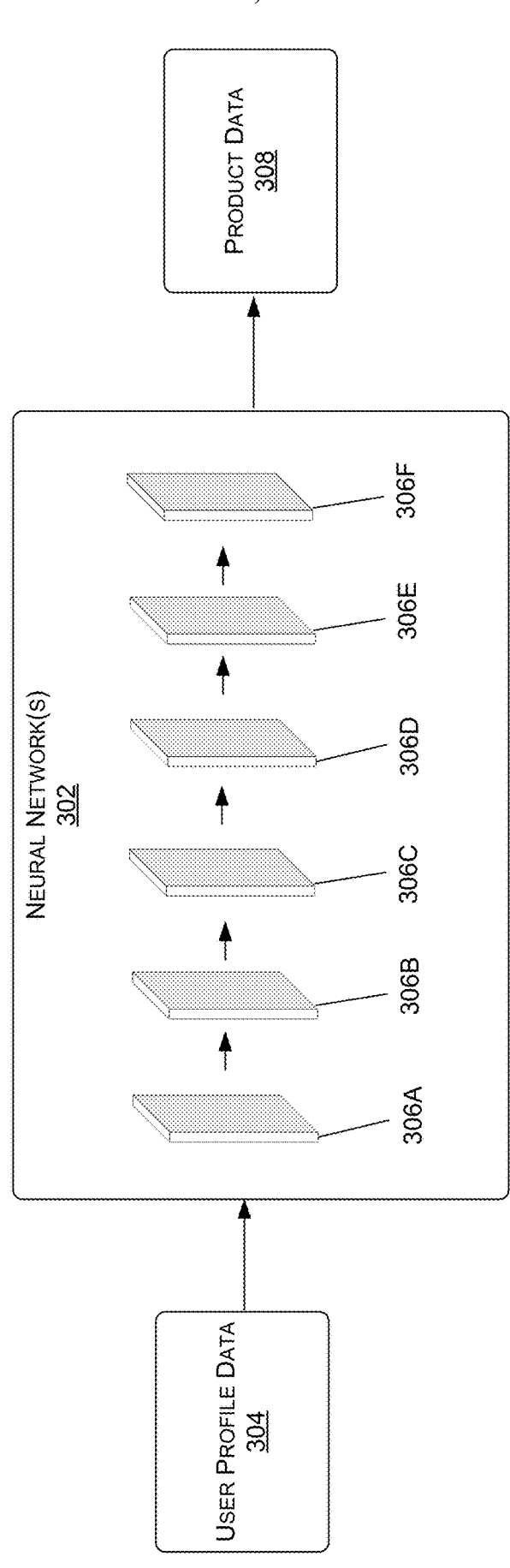
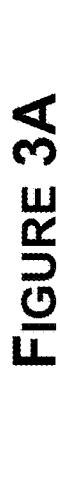
FIGURE 3A

502

EVENTS
514

FIRST EVENT

SECOND EVENT

THIRD EVENT

510(7)

510(6)

512(7)

510(5)

512(6)

508(4)

512(5)

512(4)

510(3)

510(2)

512(3)

510(1)

512(2)

512(1)

506

PRICE
504

T(0)    T(1)    T(2)    T(3)    T(4)    T(5)    T(6)    T(7)

TIME
506

600

OBTAIN NEWS DATA REPRESENTATIVE OF ONE OR MORE
FINANCIAL EVENTS ASSOCIATED WITH AN INVESTMENT AND
ONE OR MORE SOURCES ASSOCIATED WITH THE ONE OR
MORE FINANCIAL EVENTS
B602

INPUT THE NEWS DATA INTO ONE OR MORE NEURAL
NETWORKS, THE ONE OR MORE NEURAL NETWORKS
INCLUDING ONE OR MORE WEIGHTS ASSOCIATED WITH ONE
OR MORE PARAMETERS
B604

DETERMINE, USING THE ONE OR MORE NEURAL NETWORKS
AND BASED AT LEAST ON THE NEWS DATA, A PREDICTED
MOVEMENT ASSOCIATED WITH THE INVESTMENT
B606

FIGURE 6

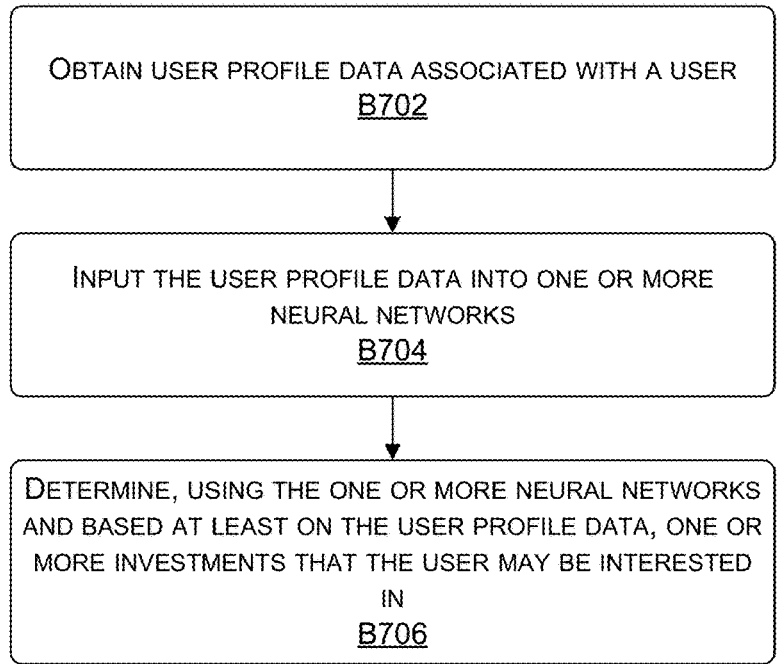
FIGURE 7

800

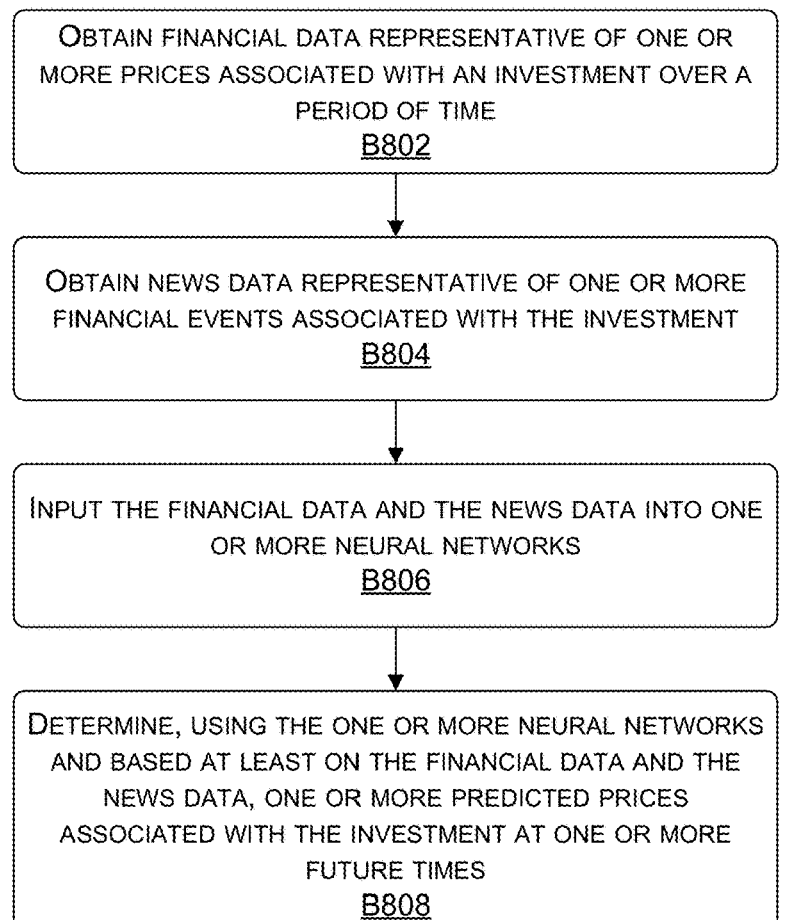

OBTAIN FINANCIAL DATA REPRESENTATIVE OF ONE OR MORE PRICES ASSOCIATED WITH AN INVESTMENT OVER A PERIOD OF TIME
B802

OBTAIN NEWS DATA REPRESENTATIVE OF ONE OR MORE FINANCIAL EVENTS ASSOCIATED WITH THE INVESTMENT
B804

INPUT THE FINANCIAL DATA AND THE NEWS DATA INTO ONE OR MORE NEURAL NETWORKS
B806

DETERMINE, USING THE ONE OR MORE NEURAL NETWORKS AND BASED AT LEAST ON THE FINANCIAL DATA AND THE NEWS DATA, ONE OR MORE PREDICTED PRICES ASSOCIATED WITH THE INVESTMENT AT ONE OR MORE FUTURE TIMES
B808

MEMORY
904

I/O COMPONENTS
914

CPU(s)
906

POWER SUPPLY
916

GPU(s)
908

PRESENTATION
COMPONENT(S)
918

COMM. INTERFACE
910

LOGIC UNIT(S)
920

I/O PORT(S)
912

902

1000

FINANCIAL INVESTMENT PREDICTIONS

BACKGROUND

Financial investments—such as in stocks, bonds, mutual funds, cryptocurrency, and the like—may include assets or items that investors buy, sell, or trade with the goal of generating income or profit. However, investing also comes with a level of risk due to the uncertainty and volatility of the various assets or markets as a whole—e.g., some financial investments are prone to rapid increases and decreases. As such, many investors use and/or receive advice from financial professionals, such as financial advisors, that are experienced in analyzing markets and/or financial news in order to predict how investments will move. While such financial professionals are able to predict the movements of investments with more accuracy than a lay person, such financial professionals still make inaccurate estimates or predictions. For instance, a financial professional may rely too heavily on a financial news event or source that is incorrect, may miss important financial information that quickly moves investment values, may apply subjective or personal feelings to certain investments, and/or may otherwise make less than ideal suggestions.

Some investors may also use systems, such as dialogue systems, to receive financial information about investments. For instance, a dialogue system may receive audio data representing user speech from an investor. The user speech may include a financial question about an investment, such as "What will the price of Stock X be next week." Based on receiving the audio data, the dialogue system may determine an answer to the financial question, such as by retrieving financial news from one or more financial resources that predict the future prices of investments. The dialogue system may then provide the answer to the investor. While such systems allow investors to receive financial information about investments, such systems merely rely on searching for and retrieving the financial information without performing any type of analysis of the financial information. For example, to answer the above question, these systems may analyze a news report that includes an estimated future stock price for Stock X, and may return that estimated stock price as the response to the query. As such, these existing systems are limited to reiterating the financial information provided in sources of financial information by investment advisors or publicists.

SUMMARY

Embodiments of the present disclosure relate to interactive systems that use neural networks to determine financial investment predictions or recommendations. Systems and methods are disclosed that make financial predictions and recommendations associated with one or more investments, such as stocks, bonds, mutual funds, cryptocurrencies, real estate, exchange-traded funds (ETFs), cash bank deposits, commodities, and/or other types of investments, using one or more neural networks. The financial predictions may include a predicted movement of an investment (e.g., extremely down, down, preserved, up, extremely up, etc.), a predicted price of an investment (e.g., a future stock price, etc.), a specific investment for a user to buy/sell/trade, and/or so forth. In some instances, the systems and methods input specific types of data into the neural network(s). The data may include, but is not limited to, user data, news data, financial data, prediction data, and/or any other type of data. In some examples, the systems and methods may include an interactive system(s), such as a dialogue system(s), that interacts with users to provide the financial predictions. For instance, the dialogue system(s) may receive inquiries about investments from users, determine financial predictions associated with the inquiries using the neural network(s), and then provide the financial predictions to the users.

In contrast to conventional systems, the systems of the present disclosure, in some embodiments, process various types of data using the neural networks that are trained to determine financial predictions for users. This provides improvements over the conventional systems, which merely receive an inquiry from a user and then retrieve financial information that is related to the inquiry. For instance, and as discussed above, such conventional systems are limited on the financial information that may be provided, such as financial information that is searchable by the systems. Additionally, such conventional systems do not perform any type of analysis on the financial information before providing the financial information to the users.

Additionally, in contrast to relying solely on financial professionals, the current systems (e.g., implementing the neural network(s)), in some embodiments, may be able to more quickly access, analyze, and generally process a larger amount of data when determining financial predictions, which may increase the accuracy of the current systems. Furthermore, and as discussed in more detail herein, the current systems (e.g., including the neural network(s)), in some embodiments, may be trained such that the systems provide more weight to financial information that is historically more accurate and/or has a tendency to impact price movements of investments and less weight to financial information that is historically less accurate and/or does not have a tendency to impact price movements of the investments. Again, in such embodiments, this may improve the accuracy of the systems when making financial predictions.

BRIEF DESCRIPTION OF THE DRAWINGS

The present systems and methods for using neural networks to determine financial investment predictions and recommendations are described in detail below with reference to the attached drawing figures, wherein:

FIG. 3A-3B illustrate example neural networks for determining investments that users may be interested in acquiring, in accordance with some embodiments of the present disclosure;

FIGS. 6-8 are flow diagrams showing methods for using a neural network(s) to determine financial predictions, in accordance with some embodiments of the present disclosure.

DETAILED DESCRIPTION

Figure 1:
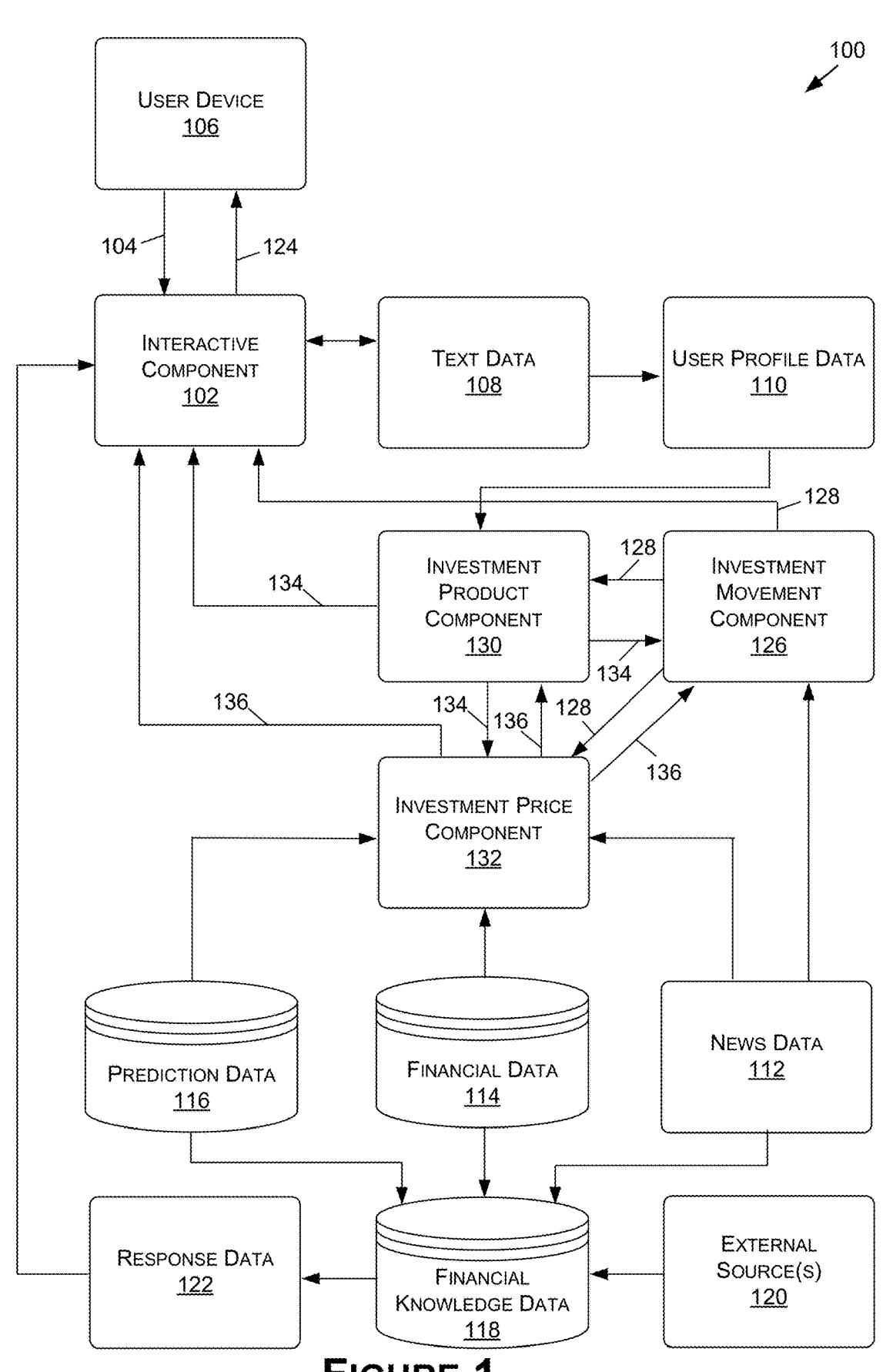
FIG. 1 illustrates an example data flow diagram for a process of providing financial predictions using a neural network(s), in accordance with some embodiments of the present disclosure.

Systems and methods are disclosed related to interactive systems that use neural networks to determine financial investment predictions and recommendations. For instance, a system(s) may obtain, generate, retrieve, and/or receive data for processing using one or more neural networks that are trained to determine financial predictions associated with financial investments. The data may include, but is not limited to, user data, news data, financial data, prediction data, and/or any other type of data. For instance, the user data may represent information about users, such as identifiers (e.g., names, usernames, etc.) of the users, ages of the users, investments that the users have acquired, investments that the users have bought/sold/traded, previous inquiries from the users, investments that the users have shown interest in, topics that the users have shown interest in, emotions associated with the users, a career of the user, a salary of the user, and/or any other information associated with the users. Any data collected from and/or about users may be collected with consent or opt-in from the users. The news data may represent news events, product events (e.g., a product release event), financial events (e.g., a stock buyback, a stock offering, etc.), company news, market news, and/or any other type of news that may impact the prices of investments. Additionally, the financial data may represent identifiers (e.g., names, symbols, tickers, etc.) of investments, previous prices associated with the investments, current prices of the investments, and/or any other investment information. Furthermore, the prediction data may represent predicted prices associated with investments, such as from one or more financial professionals or financial sources.

The system(s) may then input the data into the neural network(s) that processes the data and, based on the processing, determines the financial predictions associated with investments. As described herein, an investment may include, but is not limited to, a stock, a bond, a mutual fund, real estate, an ETF, a cash bank deposit, a cryptocurrency, a commodity, and/or other type of investment. Additionally, a financial prediction for an investment may include, but is not limited to, a predicted movement of the investment (e.g., extremely down, down, preserved, up, extremely up, etc.), a predicted price of the investment (e.g., a future stock price, etc.), a recommendation to acquire, hold, or sell the investment, and/or any other financial prediction or recommendation.

For a first example of using the neural network(s), the system(s) may input at least a portion of the data (e.g., news data associated with an investment) into a first neural network(s) that is trained to process the data and output a predicted movement associated with the investment. In some examples, the first neural network(s) may further be trained to output an indication(s) of an event(s) that caused the predicted movement of the investment and/or a weight(s) associated with the event(s). For a second example, the system(s) may input at least a portion of the data (e.g., user data associated with a user, such as representing the identity of the user, the target investment(s) of the user, the topic(s)/interest(s) of the user, the emotion(s) of the user, etc.) into a second neural network(s) that is trained to process the data and output an indication of a recommendation related to an investment. Still, for a third example, the system(s) may input at least a portion of the data (e.g., the financial data, the prediction data, and/or the news data associated with an investment) into a third neural network(s) that is trained to process the data and output one or more future price predictions associated with the investment. While these are just a couple examples of neural networks that may be used to determine financial predictions, recommendations, etc., in other examples, the system(s) may use additional and/or alternative neural networks that determine additional and/or alternative financial predictions.

In some examples, the neural network(s) may be trained using training data and corresponding ground truth data. The training data may include, but is not limited to, user data, news data (e.g., representing past news associated with investments), financial data (e.g., representing past prices associated with investments), prediction data (e.g., representing past price predictions associated with investments), and/or any other type of data. Additionally, the ground truth data may represent actual prices of investments, actual price movements of investments, actual investments acquired/held/sold/traded by users, and/or the like. Based on the training, a system(s) may be configured to update one or more parameters, one or more weights, one or more biases, one or more associations, one or more relationships, and/or the like associated with one or more layers of the neural network(s). As described in more details herein, such training to update the parameter(s), the weight(s), the bias(s), the association(s), the relationship(s), and/or the like may increase the accuracy of the neural network(s) when determining the financial predictions.

In some examples, the system(s) may provide a financial prediction(s) and/or recommendation(s) to a user based on the occurrence of one or more events. For a first example, such as when the system(s) includes a dialogue system, the dialogue system may receive audio data representing user speech from the user. The dialogue system may then process the audio data to determine an intent associated with the user speech. As described herein, in some examples, the intent may be associated with requesting information about an investment. For example, the user speech may include "What investment should I buy," "What will the price of Investment X be next week," or "Is Investment X a good purchase." Based on identifying the intent, the dialogue system may perform one or more of the processes described herein to determine a financial prediction associated with the user speech. For example, if the user speech includes "What will the price of Investment X be next week," then the financial prediction may include the predicted movement of the investment and/or the future predicted price of the investment. The dialogue system may then provide the financial prediction to the user, such as in the form of audio data representing one or more words describing the financial prediction.

For a second example, the system(s) may store a user profile associated with the user, where the user profile includes one or more identifiers of one or more investments that the user has bought/sold/traded/acquired/showed interest in. As such, the system(s) may perform one or more of the processes described herein to automatically determine one or more financial predictions associated with the acquired investment(s). The system(s) may then provide the financial prediction(s) to the user, such as via a user device. While these are just a couple example events that the system(s) may use to provide a user with financial predictions or recommendations, in other examples, the system(s) may provide financial predictions or recommendations based on the occurrence(s) of one or more additional and/or alternative events.

The systems and methods described herein may be used for a variety of purposes, by way of example and without limitation, in an in-cabin system of a machine, for synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, dialogue systems, investment predictions/recommendations, and/or any other suitable applications.

Disclosed embodiments may be comprised in a variety of different systems such as automotive systems (e.g., for use with a digital assistant/avatar/chat bot of an infotainment or in-cabin system of an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems that implement dialogue systems, financial investment systems, and/or other types of systems.

FIG. 1 illustrates an example data flow diagram for a process 100 of providing financial predictions or recommendations using a neural network(s), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include an interactive component 102 (e.g., a dialogue system(s)) receiving input data 104 (represented by the arrow) from a user device 106. The user device 106 may include a mobile phone, a tablet, a computer, an in-cabin infotainment system, a television, a voice assistant, a smart speaker, a kiosk, and/or any other type of device. In some examples, the input data 104 may include text data (e.g., text data 108) representing text, such as one or more letters, words, symbols, and/or numbers input by a user into the user device 106. For instance, the user may manually input the text into the user device 106 using one or more input devices, such as a keyboard, a touch-sensitive display, and/or the like. Based on receiving the input, the user device 106 may send the text data to the interactive component 102.

Additionally, or alternatively, in some examples, the input data 104 may include audio data representing user speech from the user. In examples where the input data 104 includes audio data, the audio data may undergo one or more processing steps. For instance, the interactive component 102 may include a speech-processing model(s) (e.g., an automatic speech recognition (ASR) model(s), a speech to text (STT) model(s), a natural language processing (NLP) model(s), a diarization model, etc.) that is configured to process the audio data in order to generate text data 108 associated with the audio data. For instance, the text data 108 may represent a transcript (e.g., one or more letters, words, symbols, numbers, sub words, tokens, etc.) associated with the user speech. In some examples, the speech-processing model(s) may further generate the text data 108 to represent additional information associated with the user speech, such as an intent of the user speech (e.g., requesting information) and/or information for a slot(s) (e.g., an investment, an ask, a date, a time, a company, a stock, etc.) associated with the intent.

As described herein, in some examples, the text data 108 may represent a request for information associated with an investment. For instance, the text data 108 may include "What investment should I buy?", "What will the price of Investment X be in a week?", or "Is this investment a good purchase?". Additionally, or alternatively, in some examples, the text data 108 may represent information associated with the user, such as an identifier (e.g., a name, a username, etc.) of the user, an age of the user, an investment(s) that the user has acquired, an investment(s) that the user has sold/bought/traded, one or more previous inquiries from the user, an investment(s) that the user is interested in, a topic(s) that the user is interested in, an emotion(s) associated with the user, a career of the user, a salary of the user, and/or any other information associated with the user. In such examples, the interactive component 102 may receive the information in the form of user speech represented by audio data, such as by using a dialogue with the user where the interactive component 102 requests specific information to help in providing the user with financial predictions. In any embodiment, the collection and use of the user data may be performed with user consent and/or opt-in.

For example, the interactive component 102 may generate and then send, to the user device 106, first audio data representing a first question, such as "What is your name?". Based on receiving the first audio data, the user device 106 may output sound represented by the first audio data to the user. In response, the user device 106 may generate second audio data representing first user speech, such as "My name is Bob," and send the second audio data to the interactive component 102 for processing. Next, the interactive component 102 may send additional questions asking for additional information associated with the user. For instance, the interactive component 102 may generate and then send, to the user device 106, third audio data representing a second question, such as "What type of investments are you interested in?". Again, based on receiving the third audio data, the user device 106 may output sound represented by the third audio data to the user. In response, the user device 106 may generate fourth audio data representing second user speech, such as "I am interested in stocks," and send the fourth audio data to the interactive component 102. These processes may then repeat in order for the interactive component 102 to receive additional information associated with the user The process 100 may include generating and/or updating a user profile associated with the user using at least the text data 108, where the user profile is represented by user profile data 110. For instance, the user profile may store information associated with the user. The information may include, but is not limited to, the identifier of the user, the age of the user, the investment(s) that the user has bought/sold/traded, the one or more previous inquiries from the user, the investment(s) that the user is interested in, the topic(s) that the user is interested in, the emotion(s) associated with the user, a risk level association with the user, a career of the user, a salary of the user, and/or any other information associated with the user. As such, when the user interacts with the interactive component 102, such as through user speech, the process 100 may include updating the user profile using the text data 108 associated with the interaction.

The process 100 may also include receiving, generating, and/or storing news data 112, financial data 114, and/or prediction data 116. The news data 112 may represent financial news (e.g., news articles, opinion articles, etc.), product news (e.g., product release news), investment news (e.g., a stock buyback, a stock offering, etc.), company news, and/or any other type of news that may impact the prices of investments. Additionally, the financial data 114 may represent prices associated with the investments at various times. For example, and for an investment such as a stock, the financial data 114 may represent the previous prices of the stock at various time intervals, such as every minute, every fifteen minutes, every thirty minutes, every hour, every day, every week, and/or the like. The prediction data 116 may represent historical financial predictions for investments, such as predicted prices and/or predicted price ranges (e.g., minimum and maximum prices) for investments from financial professionals. For example, and again for an investment such as a stock, the prediction data 116 may represent one or more future prices that one or more financial professionals have predicted for the stock.

The process 100 may also include receiving, generating, and/or storing financial knowledge data 118 associated with investments. The financial knowledge data 118 may include at least a portion of the news data 112, at least a portion of the financial data 114, and/or at least a portion of the prediction data 116. Additionally, in some examples, the financial knowledge data 118 may include additional financial information received from one or more external sources 120, such as one or more Internet resources.

The process 100 may include the interactive component 102 receiving and/or generating response data 122. For instance, and as discussed herein, the interactive component 102 may receive the input data 104 representing a request for financial information associated with an investment. As such, the interactive component 102 (and/or another component) may retrieve the requested financial information, such as using the financial knowledge data 118. For example, if the input data 104 represents a request for financial information associated with an investment, such as "Can you provide me the price of Investment X," then the interactive component 102 (and/or another component) may retrieve, from the financial knowledge data 118, financial information representing the price. The interactive component 102 (and/or another component) may then generate response data 122 representing the financial information and send the response data 122 to the user device 106, which is represented by 124.

As further illustrated in the example of FIG. 1, the process 100 may include an investment movement component 126 that determines first financial predictions associated with investments, such as predicted movements associated with the investments. For instance, the investment movement component 126 may receive data, such as at least a portion of the news data 112, and process the data using one or more neural networks. Based on the processing, the investment movement component 126 may determine the predicted movements associated with the investments. In some examples, based on the processing, the investment movement component 126 may further determine additional information, such as events that most impacted the movements of the investments. For example, and for an investment such as a stock, the investment movement component 126 may determine a predicted movement of the price of the stock and one or more events that are most important in causing the predicted movement of the price.

Figure 2A:
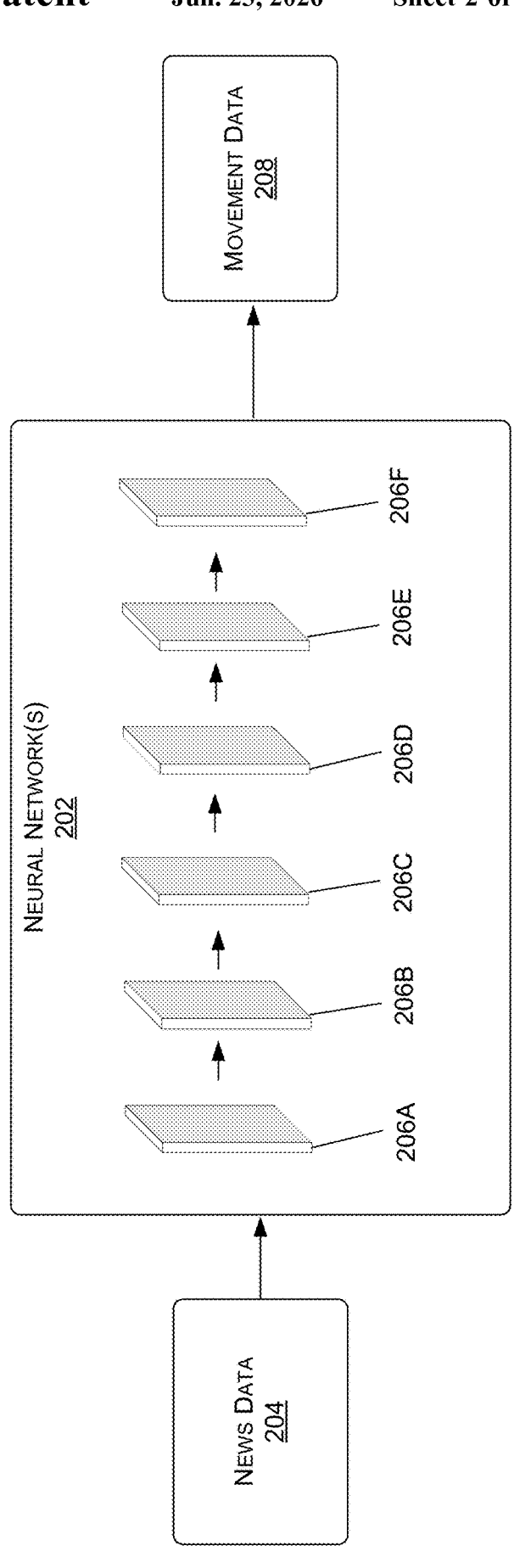
FIG. 2A-2B illustrate example neural networks for predicting movements of investments, in accordance with some embodiments of the present disclosure.

For instance, FIG. 2A illustrates a first example of a neural network(s) 202 (which may be included as part of the investment movement component 126) for predicting a movement(s) of an investment(s), in accordance with some embodiments of the present disclosure. The neural network(s) 202 may be one example of a machine learning model that may be used to perform one or more of the processes described herein.

In some examples, the neural network(s) 202 may use at least news data 204 (which may represent, and/or include, at least a portion of the news data 112) as an input. As described herein, the news data 204 may represent financial news (e.g., news articles, opinion articles, etc.), product news (e.g., product release news), investment news (e.g., a stock buyback, a stock offering, etc.), company news, market news, and/or any other type of news that may impact the prices of investments. In some examples, the neural network(s) 202 is associated with a specific investment, such as a specific stock, mutual fund, commodity, and/or the like. In such examples, the news data 204 may represent news associated with that specific investment (e.g., corresponding to the company of the stock, corresponding to the industry of the company, corresponding to the market that stock is traded on, etc.), such as news that may directly impact the price of the investment. For example, if the investment is a stock associated with a company, then the news data 204 may include news associated with the company, one or more competitor companies, one or more related companies, and/or the like.

The news data 204 may be input into a layer(s) 206 of the neural network(s) 202. The layer(s) 206 may include any number of layers 206, such as the layers 206A-206F. One or more of the layers 206 may include an input layer. The input layer may hold values associated with the news data 204.

One or more layers 206 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 206 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 206 may include a pooling layer. The pooling layer(s) may perform a down-sampling operation along the spatial dimensions (e.g., the height and the width), which may result in a smaller volume than the input of the pooling layer (e.g., 16×16×12 from the 32×32× 12 input volume). In some examples, the neural network(s) 206 may not include any pooling layers. In such examples, other types of convolution layers may be used in place of pooling layers. In some examples, the layer(s) may include alternating convolutional layers and pooling layers.

One or more of the layers 206 may include a fully connected layer. Each neuron in the fully connected layer(s) may be connected to each of the neurons in the previous volume. The fully connected layer may compute movement scores, and the resulting volume may be 1×1×N (where N is a number of movements). In some examples, the layer(s) 206 may include a fully connected layer, while in other examples, the fully connected layer of the neural network(s) 206 may be the fully connected layer separate from the layer(s) 206. In some examples, no fully connected layers may be used by the layer(s) 206 and/or the neural network(s) 202 as a whole, in an effort to increase processing times and reduce computing resource requirements. In such examples, where no fully connected layers are used, the neural network(s) 202 may be referred to as a fully convolutional network.

One or more of the layers 206 may, in some examples, include a deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer.

Although input layers, convolutional layers, pooling layers, ReLU layers, deconvolutional layers, and fully connected layers are discussed herein with respect to the layer(s) 206, this is not intended to be limiting. For example, additional or alternative layers 206 may be used, such as normalization layers, SoftMax layers, attention layers, recurrent layers, and/or other layer types.

In some examples, some of the layers 206 may include parameters (e.g., weights and/or biases) while other layers 206 may not. In some examples, the parameters may be learned by the neural network(s) 206 during training. Further, some of the layers 206 may include additional hyper-parameters (e.g., learning rate, stride, epochs, kernel size, number of filters, type of pooling for pooling layers, etc.)— such as the convolutional layer(s), the deconvolutional layer(s), and the pooling layer(s)—while other layers 206 may not, such as the ReLU layer(s). Various activation functions may be used, including but not limited to, ReLU, leaky ReLU, sigmoid, hyperbolic tangent, exponential linear unit (ELU), etc. The parameters, hyper-parameters, and/or activation functions are not to be limited and may differ depending on the embodiment.

In any example, the neural network(s) 202 may output movement data 208 indicating the predicted movement of the investment. As described herein, the predicted move-ment may include, but is not limited to, extremely down, down, preserved (no significant change, less than a threshold amount of change), up, extremely up, and/or the like. In some examples, the movement data 208 may further repre-sent one or more events (e.g., a threshold number of events) that most impacted the predicted movement of the invest-ment. For example, if the neural network(s) 202 extracted ten events from the news data 204 (which is described in further detail herein), then the movement data 208 may represent the top five events that impacted the predicted movement of the investment. As will be described below, the neural network(s) 202 may determine the one or more events based on respective weights associated with the events.

Figure 2B:
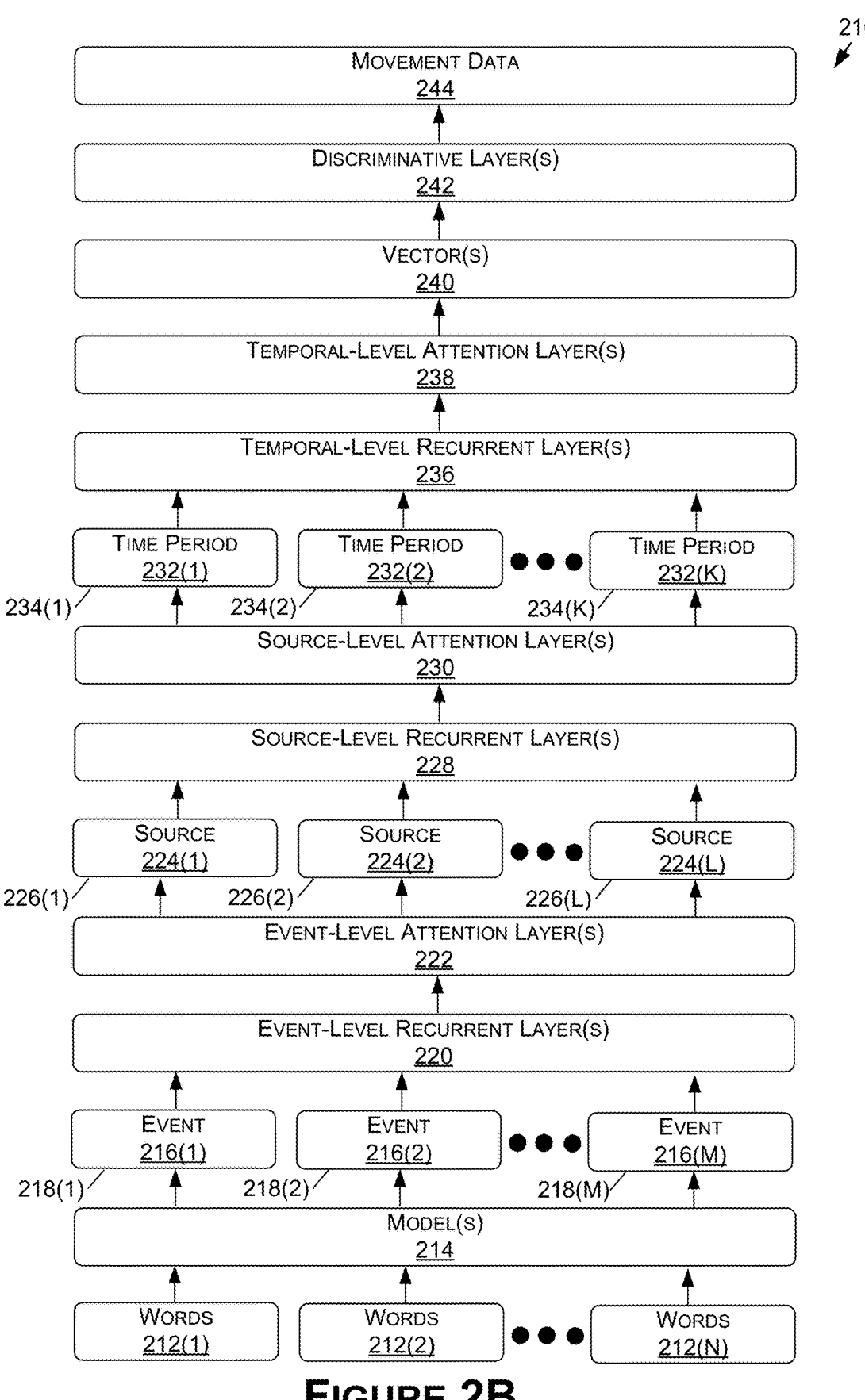

FIG. 2B illustrates a second example of a neural network(s) 210 (which may be included as part of the investment movement component 126) (which may repre-sent, and/or include, the neural network(s) 202) for predict-ing a movement(s) of an investment(s), in accordance with some embodiments of the present disclosure. As shown, the neural network(s) 210 may receive, as input, words 212(1)-(N) (also referred to as "words 212") representing financial news, such as financial news represented by news data (e.g., the news data 112, the news data 204, etc.). For example, the words 212(1) may represent first financial news, such as a first financial article associated with a company, the words 212(2) may represent second financial news, such as a second financial article associated with the company, and the words 212(3) may represent third financial news, such as a third financial article associated with the company. In some examples, the words 212 associated with the financial news may be represented using vectors.

The words 212 may be input into a model(s) 214 that is trained to process the words 212 and identify events 216 (1)-(M) (also referred to singularly as "event 216" or in plural as "events 216"). The model(s) 214 may include any type of model, such as a bidirectional encoder representa-tions and transformers (BERT) model. To identify the events 216, the model(s) 214 may be configured to process the words 212 from the financial news and extract portions of the words that represent the events. In some examples, the model(s) 214 may extract a threshold number of words 212 to represent an event 216, such as one word 212, five words 212, ten words 212, fifty words 212, and/or any other number of words 212. In some examples, the model(s) 212 may extract the events 216 based on identifying one or more words 212 that represent an entity (e.g., a name of a company, business, corporation, investment, employee, etc.), one or more words 212 that represent a pronoun associated with an entity, one or more financial words 212 (e.g., buy, sell, liquidate, stock, bond, mutual fund, money, etc.), and/or the like.

For example, if the words 212 for financial news include "We believe that there will be a buying opportunity for the stock of Company X in the future," then the model(s) 214 may be trained to identify words such as "buying," "stock," and "Company X." The model(s) 214 may then extract the words 212 "buying opportunity for the stock of Company X" as the event 216. Other examples of extracted events 216 may include "this is a buying opportunity," "congress will pass a controversial $700 billion dollar bill," "people should sell," "a new CEO has been hired by the company," and/or the like. In other words, in some examples, the model(s) 214 may be trained to extract events 216 that may have an impact on the investment for which the neural network(s) 210 is analyzing.

In some examples, the neural network(s) 210 may be configured to identify a threshold number of events 216

(e.g., based on a parameter of the neural network(s) 210, such as a parameter set by a user or learned during training). The threshold number of events 216 may include, but is not limited to, one event 216, five events 216, ten events 216, fifty events 216, one hundred events 216, and/or any other number of events 216. In some examples, and as illustrated by the example of FIG. 2B, the neural network(s) 210 may associate the events 216 with weights 218(1)-(M) (also referred to singularly as "weight 218" or in plural as "weights 218"). For example, the event 216(1) may be associated with the highest weight 218(1), the event 216(2) may be associated with the second highest weight 218(2), and/or so forth until the event 216(M) that is associated with the lowest weight 218(M). In such examples, the neural network(s) 210 may determine the weights 218 for the different events 216 during training, which is described in more detail at least with respect to FIG. 2C.

The neural network(s) 210 may process the events 216 (and/or the words 212) using an event-level recurrent layer(s) 220 and an event-level attention layer(s) 222. Based on the processing, the neural network(s) 210 may identify sources 224(1)-(L) (also referred to singularly as "source 224" or in plural as "sources 224") associated with the events 216. The sources 224 may include news organizations (e.g., BLOOMBERG, REUTERS, etc.), financial professionals, companies, corporations, business, and/or any other entity that creates and/or provides financial news. In some examples, the neural network(s) 210 may be configured to process events 216 associated with a threshold number of sources 224 (e.g., based on a parameter of the neural network(s) 210, such as a parameter set by a user or learned during training). The threshold number of sources 224 may include, but is not limited to, one source 224, five sources 224, ten sources 224, and/or the like.

In some examples, and as shown by the example of FIG. 2B, the neural network(s) 210 may associate the sources 224 with weights 226(1)-(L) (also referred to singularly as "weight 226" or in plural as "weights 226"). For example, the source 224(1) may be associated with the highest weight 2226(1), the source 224(2) may be associated with the second highest weight 226(2), and/or so forth until the source 224(L) that is associated with the lowest weight 226(L). In such examples, the neural network(s) 210 may determine the weights 226 for the different sources 224 during training, which is again described in more detail at least with respect to FIG. 2C. In some examples, the weights 226 may not indicate how correct the sources 224 are at providing financial news, but indicate how much impact the financial news from the sources 224 have on the investment. For example, a lot more users may use financial news from the source 224(1) when making investments as compared to financial news from the source 224(L). As such, the weight 226(1) associated with the source 224(1) may be a lot greater than the weight 226(L) associated with the source 224(L). In any example, the neural network(s) 210 may learn the weights during training using different events from different sources and the associated investment price/value changes associated with such events and sources.

The neural network(s) 210 may then process the sources 224 (and/or the events 216 and/or the words 212) using a source-level recurrent layer(s) 228 and a source-level attention layer(s) 230. Based on the processing, the neural network(s) 210 may identify time periods 232(1)-(K) (also referred to singularly as "time period 232" or in plural as "time periods 232") associated with the events 216. The time periods 232 may include any time period, such as one hour, one day, one week, one month, and/or the like. For instance, such as when the time periods 232 includes days, the time period 232(1) may include a current day, the time period 232(2) may include the previous day, and/or so forth until the time period 232(K). In some examples, the neural network(s) 210 may be configured to process a threshold number of time periods 232 (e.g., based on a parameter of the neural network(s) 210, such as a parameter set by the user or learned during training). For example, if the neural network(s) 210 is configured to process events 216 that occurred in the last week and each time period 232 represents a day, then the neural network(s) 210 may include seven time periods 232.

In some examples, and as shown by the example of FIG. 2B, the neural network(s) 210 may associate the time periods 232 with weights 234(1)-(K) (also referred to singularly as "weight 234" or in plural as "weights 234"). For example, the time period 232(1) may be associated with the highest weight 234(1), the time period 232(2) may be associated with the second highest weight 234(2), and/or so forth until the time period 234(K) that is associated with the lowest weight 234(L). In such examples, the neural network(s) 210 may determine the weights 234 for the different time periods 232 during training, which is again described in more detail with respect to at least FIG. 2C. For example, and during training, the neural network(s) 210 may determine that the most recent events 216 provide the most impact on the investment. As such, the neural network(s) 210 may associated the most recent time period 232(1) with the highest weight 234(1). Additionally, during training, the neural network(s) 210 may determine that the oldest events 216 provide the least impact on the investment. As such, the neural network(s) 210 may associated the oldest time period 232(K) with the lowest weight 234(K).

The neural network(s) 210 may then process the time periods 232 (and/or the sources 224, the events 216, and/or the words 212) using a temporal-level recurrent layer(s) 236 and a temporal-level attention layer(s) 238. Based on the processing, the neural network(s) 210 may generate a vector(s) 240 that is fed into a discriminative layer(s) 242 of the neural network(s) 210. The discriminative layer(s) 242 may process the vector(s) 240 and, based on the processing, generate movement data 244 (which may represent, and/or include, the movement data 208). As described herein, the movement data 244 may represent the predicted movement of the investment. In some examples, the movement data 244 may further represent one or more events 216 (e.g., a threshold number of events 216) that most impacted the predicted movement of the investment, where the event(s) 216 is selected based on the weights 218 of the events 216.

For example, the neural network(s) 210 may determine ten events 216, where each event 216 is associated with a respective weight 218. If the neural network(s) 210 is configured to select the five events 216 that most impacted the predicted movement, then the neural network(s) 210 may select the five events 216 that include the five highest weights 218. The neural network(s) 210 may then generate the movement data 244 that represents the predicted movement, the five selected events 216, and/or the weights 218 for the five selected events 216.

Figure 2C:
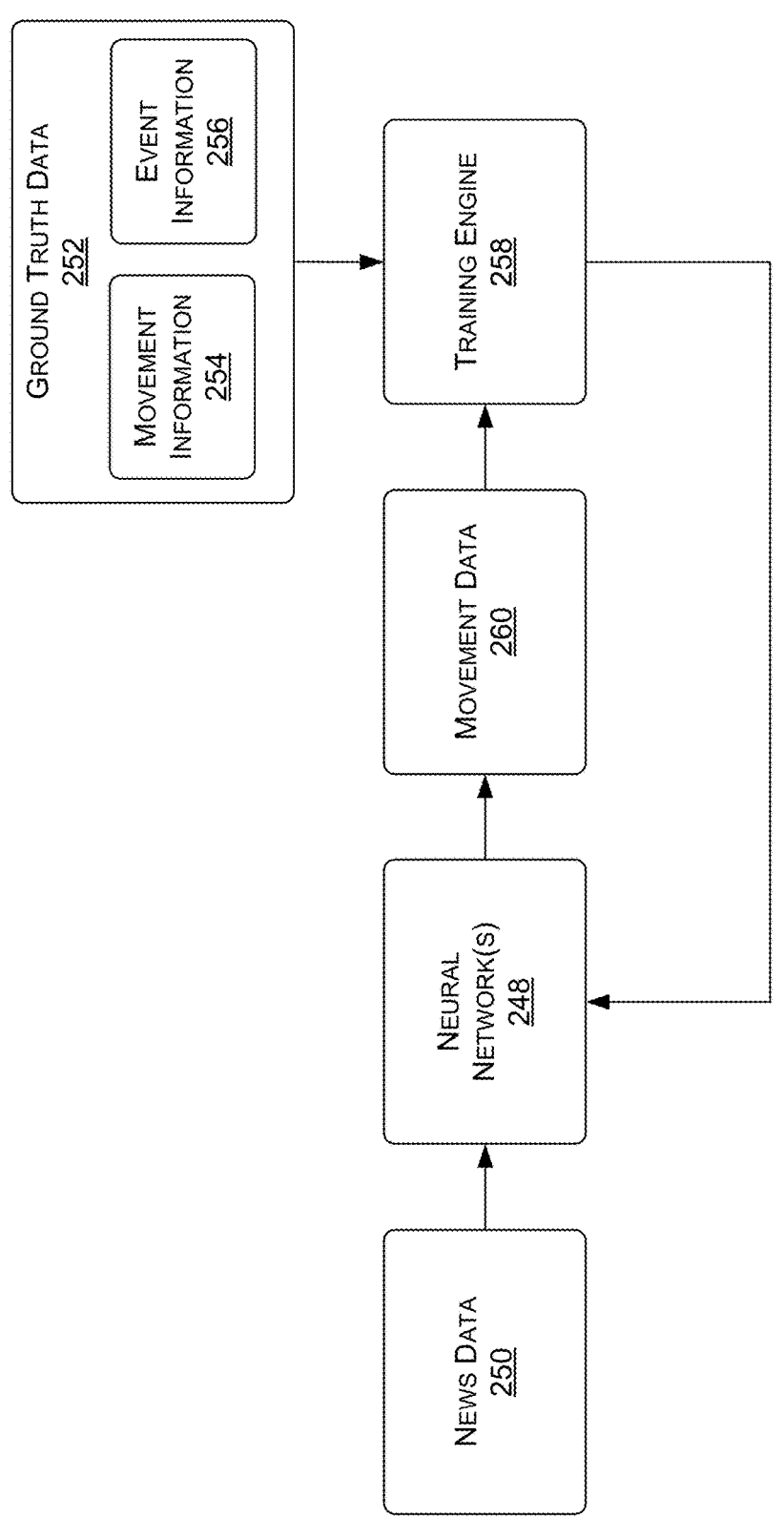
FIG. 2C is a data flow diagram illustrating a process for training a neural network(s) to predicted movements of investments, in accordance with some embodiments of the present disclosure.

Now referring to FIG. 2C, FIG. 2C is a data flow diagram illustrating a process 246 for training a neural network(s) 248 (which may represent, and/or include, the neural network(s) 202 and/or the neural network(s) 210) to predict a movement(s) of an investment(s), in accordance with some embodiments of the present disclosure. As shown, the neural network(s) 248 may be trained using news data 250 (e.g., training data) (which may represent, and/or include, the news data 112). As described herein, the news data 250 may represent financial news (e.g., news articles, opinion articles, etc.), product news (e.g., product release news), investment news (e.g., a stock buyback, a stock offering, etc.), market news, company news, industry news, and/or any other type of news that may impact the prices of investments. In some examples, in addition to, or alternatively from, using the news data 250 to train the neural network(s) 248, event data representing events (e.g., events 216) may be used to train the neural network(s) 248.

The neural network(s) 248 may be trained using the training news data 250 as well as corresponding ground truth data 252. The ground truth data 252 may include annotations, labels, masks, and/or the like. For example, in some embodiments, the ground truth data 252 may include movement information 254 and/or event information 256. In some examples, the movement information 254 may indicate the actual movement of the investment based on the training news data 250. For example, the movement information 254 may indicate whether the investment was extremely down, down, preserved (no significant change), up, extremely up, and/or the like. These determinations may be made using defined thresholds (e.g., changes of more than some monetary value, or some percentage from a prior price, etc., may indicate a significant change (either up or down), while changes of less monetary value or less percentage, etc. may represent a less significant change, or preserved). In some examples, the event information 256 may indicate the top threshold number of events that caused the movement of the investment. In such examples, one or more of the events may include a respective weight.

The ground truth data 252 may be generated within a drawing program (e.g., an annotation program), a computer aided design (CAD) program, a labeling program, another type of program suitable for generating the ground truth data 252, and/or may be hand drawn, in some examples. In any example, the ground truth data 252 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). In some examples, each period associated with the news data 250 may include corresponding ground truth data 252.

A training engine 258 may use one or more loss functions that measure loss (e.g., error) in movement data 260 output by the neural network(s) 248 as compared to the ground truth data 252. In some examples, the movement data 260 may represent the predicted movements of the investment, the event(s) that most impacted predicted movements, and/or the weight(s) associated with the event(s), similar to the movement data 208 and/or the movement data 244. Any type of loss function may be used, such as cross entropy loss, mean squared error, mean absolute error, mean bias error, and/or other loss function types. In some embodiments, different information represented by the movement data 260 may have different loss functions. For example, the predicted movements may have a first loss function and the events may have a second loss function. In such examples, the loss functions may be combined to form a total loss, and the total loss may be used to train (e.g., update the parameters of) the neural network(s) 248. In any example, backward pass computations may be performed to recursively compute gradients of the loss function(s) with respect to training parameters. In some examples, weights and biases of the neural network(s) 248 may be used to compute these gradients.

For example, the training engine 258 may update one or more weights associated with the neural network(s) 248, such as the weights 218 associated with the events 216, the weights 226 associated with the sources 224, and/or the weights 234 associated with the time periods 232 from the example of FIG. 2B. In other words, during training, the neural network(s) 248 may be updated to indicate which events provide the most impact to the predicted movement, which sources provide the most impact to the predicted movement, and/or which time periods provide the most impact to the predicted movement.

Referring back to the example of FIG. 1, the investment movement component 126 may send movement data 128 (which may represent, and/or include, the movement data 208 and/or the movement data 244) to the interactive component 102, an investment product component 130, and/or an investment price component 132. As will be described in more detail below, the interactive component 102 may then provide the movement data 128 to the user device 106.

The process 100 may include the investment product component 130 that determines second financial predictions associated with investments, such as investments that users may be interested in and/or acquire. For instance, the investment product component 130 may receive data, such as at least a portion of the user profile data 110, and process the data using one or more neural networks. Based on the processing, the investment product component 130 may determine an investment(s) for a user. In some examples, based on the processing, the investment product component 130 may determine additional information, such as a score(s) for the investment(s).

For instance, FIG. 3A illustrates a first example of a neural network(s) 302 (which may be included as part of the investment product component 130) for predicting investments that users may be interested in acquiring, in accordance with some embodiments of the present disclosure. The neural network(s) 302 may be one example of a machine learning model that may be used to perform one or more of the processes described herein.

In some examples, the neural network(s) 302 may use user profile data 304 (which may represent, and/or include, at least a portion of the user profile data 110) as an input. As described herein, the user profile data 304 may represent an identifier of a user, an age of the user, an investment(s) that the user has acquired, an investment(s) that the user has sold, one or more previous inquiries from the user, an investment(s) that the user is interested in, a topic(s) that the user is interested in, an emotion(s) associated with the user, a career of the user, a salary of the user, and/or any other information associated with the user.

The user profile data 304 may be input into a layer(s) 306 of the neural network(s) 302. The layer(s) 306 may include any number of layers 306, such as the layers 306A-306F. One or more of the layers 306 may include an input layer. The input layer may hold values associated with the user profile data 304. For example, the input layer(s) 306 may receive and/or generate a first vector associated with an identity of the user, a second vector associated with a target investing product for the user, a third vector associated with a topic(s)/interest(s) of the user, a fourth vector associated with an emotion(s) of the user, and/or so forth.

One or more layers 306 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 306 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 306 may include a pooling layer. The pooling layer may perform a down-sampling operation along the spatial dimensions (e.g., the height and the width), which may result in a smaller volume than the input of the pooling layer (e.g., 16×16×12 from the 32×32× 12 input volume). In some examples, the neural network(s) 302 may not include any pooling layers. In such examples, other types of convolution layers may be used in place of pooling layers. In some examples, the layer(s) 306 may include alternating convolutional layers and pooling layers.

One or more of the layers 306 may include a fully connected layer. Each neuron in the fully connected layer(s) may be connected to each of the neurons in the previous volume. The fully connected layer may compute movement scores, and the resulting volume may be 1×1×N (where N is a number of movements). In some examples, the layer(s) 306 may include a fully connected layer, while in other examples, the fully connected layer of the neural network(s) 302 may be the fully connected layer separate from the layer(s) 306. In some examples, no fully connected layers may be used by the layer(s) 306 and/or the neural network(s) 302 as a whole, in an effort to increase processing times and reduce computing resource requirements. In such examples, where no fully connected layers are used, the neural network(s) 302 may be referred to as a fully convolutional network.

One or more of the layers 306 may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer.

Although input layers, convolutional layers, pooling layers, ReLU layers, deconvolutional layers, and fully connected layers are discussed herein with respect to the layer(s) 306, this is not intended to be limiting. For example, additional or alternative layers 306 may be used, such as normalization layers, SoftMax layers, attention layers, recurrent layers, embedding layers, filtering layers, output layers, and/or other layer types.

In some examples, some of the layers 306 may include parameters (e.g., weights and/or biases) while others may not. In some examples, the parameters may be learned by the neural network(s) 302 during training. Further, some of the layers 306 may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent, exponential linear unit (ELU), etc. The parameters, hyper-parameters, and/or activation functions are not to be limited and may differ depending on the embodiment.

In any example, the neural network(s) 302 may output product data 308 representing one or more investments that the user may be interested in and/or should acquire. Additionally, in some examples, the product data 308 may represent one or more scores for the investment(s), such that the user is able to determine the highest rated investment(s).

Figure 3B:
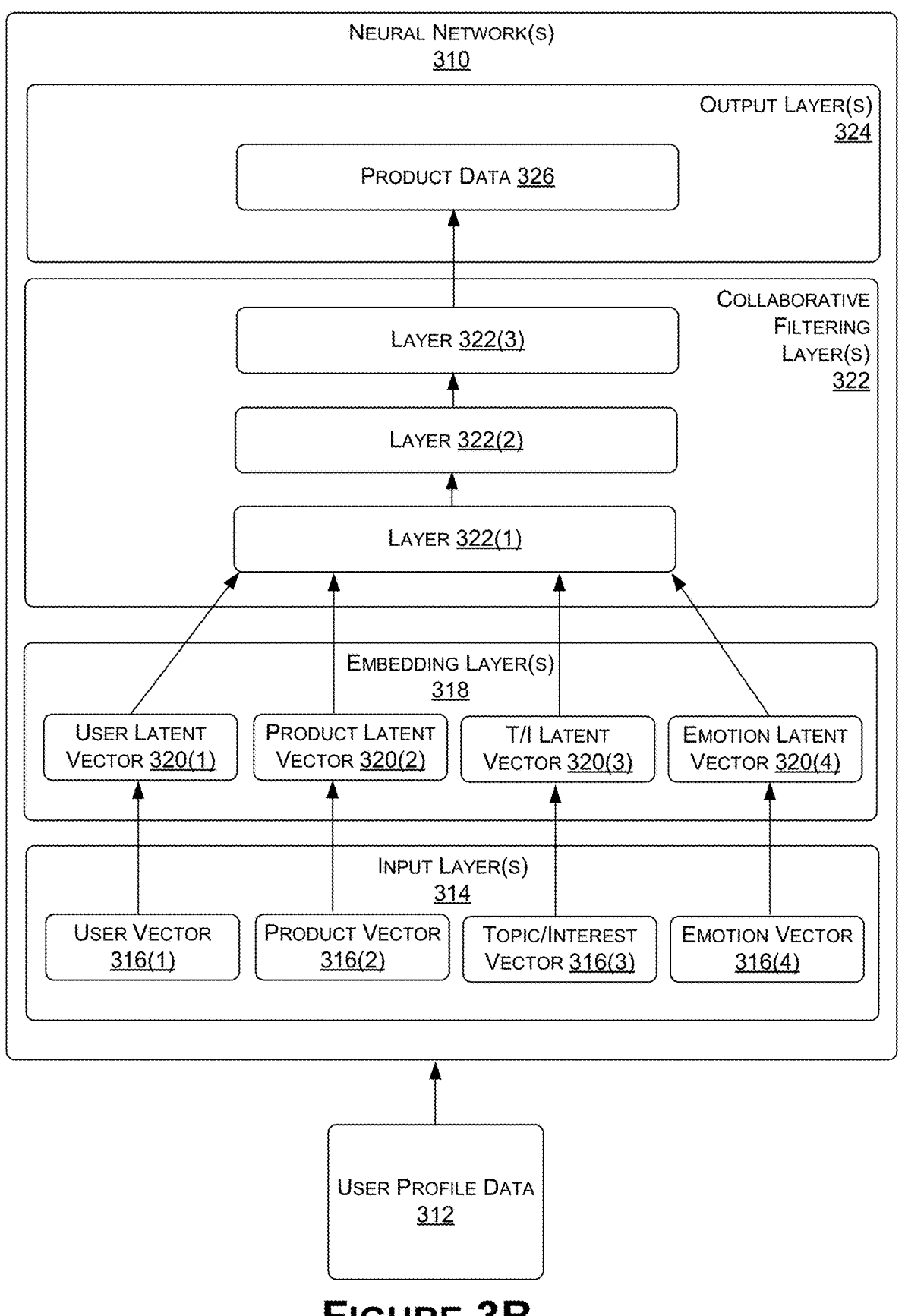

FIG. 3B illustrates a second example of a neural network(s) 310 (which may be included as part of the investment product component 130) (which may include, and/or represent, the neural network(s) 302) for predicting investments that user may be interested in acquiring, in accordance with some embodiments of the present disclosure. As shown, the neural network(s) 310 may receive user profile data 312 (which may represent, and/or include, at least a portion of the user profile data 110 and/or the user profile data 304) as an input. As described herein, the user profile data 312 may represent an identifier of a user, an age of the user, an investment(s) that the user has acquired, an investment(s) that the user has sold, one or more previous inquiries from the user, an investment(s) that the user is interested in, a topic(s) that the user is interested in, an emotion(s) associated with the user, a career of the user, a salary of the user, and/or any other information associated with the user.

The neural network(s) 310 may include an input layer(s) 314. In some examples, the input layer(s) 314 may use expressions (e.g., one-hot expressions) to describe inputs for the user, the target investment(s) (e.g., an investing product(s)) for the user, the topic(s)/interest(s) of the user, and/or the emotion(s) of the user. For instance, and as shown, the input layer(s) 314 may receive and/or generate a user vector 316(1) that represents an expression for the user, a product vector 316(2) that represents an expression for the target investment(s) for the user, a topic/interest vector 316(3) that represents an expression for the topic(s)/interest(s) of the user, and an emotion vector 316(4) that represents an expression for the emotion(s) of the user.

In some examples, the user vector 316(1) may include a length that is based on the number of users, where an element associated with the user includes a different value than the other elements of the user vector 316(1). For example, the user vector 316(1) may include a respective element for one or more users (e.g., each user), where all of the elements include a first value (e.g., 0) except for the element associated with the user, which includes a second value (e.g., 1). In some examples, the product vector 316(2) may include a length that is based on the number of products (e.g., investments) that users may target, where an element(s) associated with the product(s) (e.g., the investment(s)) being analyzed includes a different value than the other elements of the product vector 316(2). For example, the product vector 316(2) may include a respective element for one or more investments (e.g., each investment) that the users may target, where the elements include a first value (e.g., 0) if the user is not targeting the investments and a second value (e.g., 1) if the user is targeting the investments.

In some examples, the topic/interest vector 316(3) may include a length that is based on the number of topics/interests for users, where an element(s) associated with a topic(s)/interest(s) of the user includes a different value than elements of other topics/interests. For example, the topic/interest vector 316(3) may include a respective element for one or more topics/interests (e.g., each topic/interest), where the element(s) associated with topic(s)/interest(s) that the user is interested in include a first value (e.g., 1) and/or a first weight and the elements associated with topics/interests that the user is not interested in include a second value (e.g., 0) and/or a second weight. In some examples, the emotion vector 316(4) may include a length that is based on the number of emotions that users may have for investments, where an element(s) associated with an emotion(s) of the user includes a different value than elements of other emotions. For example, the emotion vector 316(4) may include a respective element for one or more emotions (e.g., each emotion) that users may have for investments, where the element(s) associated with the emotion(s) that the user has includes a first value (e.g., 1) and the elements associated with emotions that the user does not have include a second value (e.g., 0).

The neural network(s) 318 may also include an embedding layer(s) 318. The embedding layer(s) 318 may be configured to project the expressions (e.g., the vectors 316(1)-(4)) of the input layer(s) 314 into dense vectors 320(1)-(4). For instance, the dense vectors 316(1)-(4) may be determined by the following:

$$du = \text{dense\_vector\_user}_{1*k} = \text{user}_{1*|U|} * U_{|U|*K} \quad (1)$$

$$df = \text{dense\_vector\_product}_{1*k} = \text{product}_{1*|F|} * I_{|F|*K} \quad (2)$$

$$dt = \text{dense\_vector\_topic}_{1*k} = \text{topic}_{1*|T|} * T_{|T|*K} \quad (3)$$

$$de = \text{dense\_vector\_emotion}_{1*k} = \text{emotion}_{1*|E|} * E_{|E|*K} \quad (4)$$

In equations (1)-(4), it is assumed that there are a total of $|U|$ users, $|F|$ investments, $|T|$ topics/interests, and $|E|$ emotions. Additionally, the user vector 316(1) is $\text{user}_{1*|U|}$, the product vector 316(2) is $\text{product}_{1*|F|}$, the topic/interest vector 316(3) is $\text{topic}_{1*|T|}$, and the emotion vector 316(4) is $\text{emotion}_{1*|E|}$. Furthermore, 1 is the number of rows and $|U|$ is the number of columns. Moreover, U, I, T, and E stand for the embedding of the matrixes.

The neural network(s) 310 may also include a collaborative filtering layer(s) 322. The collaborative filtering layer(s) 322 may include a number of layers 322(1)-(3), although three layers 322(1)-(3) is illustrated for the example of FIG. 3B. The collaborative filtering layer(s) 322 may take the vectors 320(1)-(4) as inputs and project the relations of the vectors 320(1)-(4) into another vector(s) in which the non-linear relations among the vectors 320(1)-(4) is implicitly expressed. In some examples, the target of the collaborative filtering layer(s) 322 may be to map the vectors 320(1)-(4) into prediction scores (e.g., "1" for positive and "0" for negative).

The neural network(s) 310 may further include an output layer(s) 324. The output layer(s) 324 may be configured to compute product data 326 (which may represent, and/or include, the product data 308) associated with the investment. As described herein, the product data 326 may indicate whether a user may be interested in acquiring an investment. In some examples, the product data 326 may represent a Boolean score, such as 1 indicating that the user may be interested in the investment and 0 indicating that the user may not be interested in the investment. In some examples, the product data 326 may represent a score that falls within a range of scores, such as between 0 and 100 (although any other range may also be used), where a score near 0 indicates that the user may not be interested in the investment and a score near 100 indicates that the user may be interested in the investment.

Figure 3C:
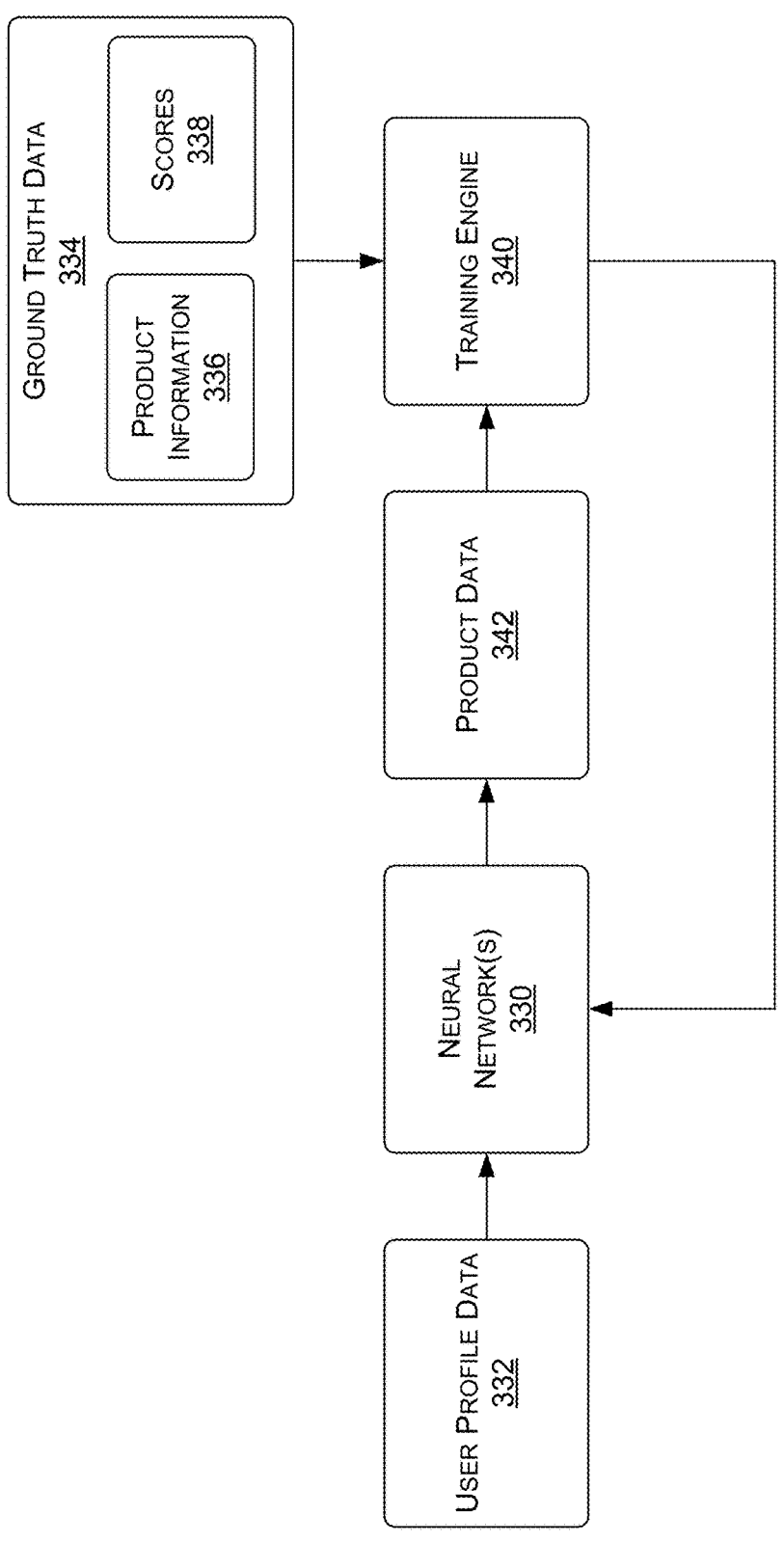
FIG. 3C is a data flow diagram illustrating a process for training a neural network(s) to determine investments that users may be interested in acquiring, in accordance with some embodiments of the present disclosure.

Now referring to FIG. 3C, FIG. 3C is a data flow diagram illustrating a process 328 for training a neural network(s) 330 (which may represent, and/or include, the neural network(s) 302 and/or the neural network(s) 310) to determine investments that users may be interested in acquiring, in accordance with some embodiments of the present disclosure. As shown, the neural network(s) 330 may be trained using user profile data 332 (e.g., training data) (which may represent, and/or include, the user profile data 110). As described herein, the user profile data 332 associated with a user may represent an identifier of the user, an age of the user, an investment(s) that the user has acquired, an investment(s) that the user has sold, one or more previous inquiries from the user, an investment(s) that the user is interested in, a topic(s) that the user is interested in, an emotion(s) associated with the user, a career of the user, a salary of the user, and/or any other information associated with the user. In some examples, the neural network(s) 330 is trained using user profile data 332 associated with a single user. In some examples, the neural network(s) 330 is trained using user profile data 332 associated with multiple users.

The neural network(s) 330 may be trained using the training user profile data 332 as well as corresponding ground truth data 334. The ground truth data 334 may include annotations, labels, masks, and/or the like. For example, in some embodiments, the ground truth data 334 may include product information 336 and/or scores 338. In some examples, the product information 336 may indicate whether users are actually interested in investments (e.g., yes, no, etc.), whether users actually acquired investments (e.g., yes, no, etc.), and/or other information about the interests of users with investments. The scores 338 may include numerical values indicating the interests of the users with the investments. For example, if users are actually interested in investments and/or actually acquired the investments, then the scores 338 may include a first value (e.g., 1). However, if users are not actually interested in investments and/or did not actually acquire the investments, then the scores 338 may include a second value (e.g., 0).

The ground truth data 334 may be generated within a drawing program (e.g., an annotation program), a computer aided design (CAD) program, a labeling program, another type of program suitable for generating the ground truth data 334, and/or may be hand drawn, in some examples. In any example, the ground truth data 334 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer).

A training engine 340 may use one or more loss functions that measure loss (e.g., error) in product data 342 output by the neural network(s) 330 as compared to the ground truth data 334. As described herein, the product data 342 may indicate whether a user should acquire an investment, such as a score indicating whether the user should acquire the investment, similar to the product data 308 and/or the product data 326. Any type of loss function may be used, such as cross entropy loss, mean squared error, mean absolute error, mean bias error, and/or other loss function types. In some examples, backward pass computations may be performed to recursively compute gradients of the loss function(s) with respect to training parameters. In some examples, weight and biases of the neural network(s) 330 may be used to compute these gradients.

For an example of determining the loss, the product data 342 may represent a score, y'$_{uite}$( ), which may be compared to a reference score, y$_{uite}$ (which may be represented by the scores 338). In order to learn the parameters associated with the neural network(s) 330, a pointwise method that performs a regression with squared loss may be employed, such as:

$$\text{Loss} = \sum_{m=1}^{M} (y'_m - y_m)^2 \qquad (5)$$

In equation (5), M stands for the number of samples in the training data. The neural collaborative filtering model is then formulated by:

$$y'_{uite} = f(du, df, dt, de \mid U, I, T, E, \theta_f) \qquad (6)$$

In equation (6), $\theta_f$ denotes the model parameters of the interaction function $f$. As such, $f$ may be formulated by:

$$f(du, df, dt, de \mid U, I, T, E, \theta_f) = \qquad (7)$$

$$\Phi_{out}(\Phi_N( \ \dots \ \Phi_2(\Phi_1(du, df, dt, de)) \ \dots \ ))$$

In equation (7), $\Phi_{out}$ and $\Phi_N \dots \Phi_1$ respectively denote the mapping function for the output layer and N-th to 1-th neural collaborative filtering layers, supposing that there are N collaborative filtering layers in total.

Considering the one-class nature of implicit feedbacks (e.g., positive and negative for the recommended investments), the value y$_{uite}$ may include a label. In some examples, the value of the label may include a first value (e.g., 1) indicating that the investment i is relevant to the user u under a conversation with topics t and the user's emotions e. As such, training samples that have a relevant score of the first value (e.g., 1) may be denoted as Y$^+$. Otherwise, training samples that have the relevant score of the second value (e.g., 0) may be denoted as Y$^-$. In some examples, the unification of Y$^+$ and Y$^-$ forms the training data set.

The predicted score y'$_{uite}$ may then represent how likely the investment i is relevant to the user u under a session with topics t and emotions e. Thus, y'$_{uite}$ may also include a value that includes the first score (e.g., 1) or the second score (e.g., 0). In some examples, a binary classification oriented logistic regression function may be used as the activation function of the output layer $\Phi_{out}$. As such, the likelihood function may be defined as:

$$p(Y^+, Y^- \mid U, I, T, E, \Phi_f) = \prod_{(u,i,t,e) \in Y^-} (1 - y'_{uite}) \qquad (8)$$

Taking the negative logarithm of the likelihood, the equation may include:

$$L = -\sum_{(u,i,t,e) \in Y^+} (\log y'_{uite}) - \sum_{(u,i,t,e) \in Y^-} (\log(1 - y'_{uite})) = \qquad (9)$$

$$-\sum_{(u,i,t,e) \in Y^+ \cup Y^-} \{(y_{uite} * \log y'_{uite}) + (1 - y_{uite}) * \log(1 - y'_{uite})\}$$

In some examples, the function is to minimize the neural network(s) 330 and the function's organization may be done by performing stochastic gradient descent (SGD)-family algorithms. In some examples, equation (9) may be the same with binary cross-entropy loss or log loss.

Referring back to the example of FIG. 1, the investment product component 130 may send product data 134 (which may represent, and/or include, the product data 308 and/or the product data 326) to the interactive component 102, the investment movement component 126, and/or the investment price component 132. As will be described in more detail below, the interactive component 102 may then provide the product data 134 to the user device 106.

The process 100 may include the investment price component 132 that determines third financial predictions associated with investments, such as future predicted prices associated with the investments. For instance, the investment price component 132 may receive data, such as at least a portion of the financial data 114, the historical prediction data 116, the news data 112, and/or the user profile data 110, and process the data using one or more neural networks. Based on the processing, the investment price component 132 may determine the future predicted prices for an investment. In some examples, the future predicted prices may be at given time intervals (e.g., a predicted price every fifteen minutes into the future for a given time period), be associated with a range (e.g., a minimum and maximum price range), be associated with an average over a time period, and/or the like.

Figure 4A:
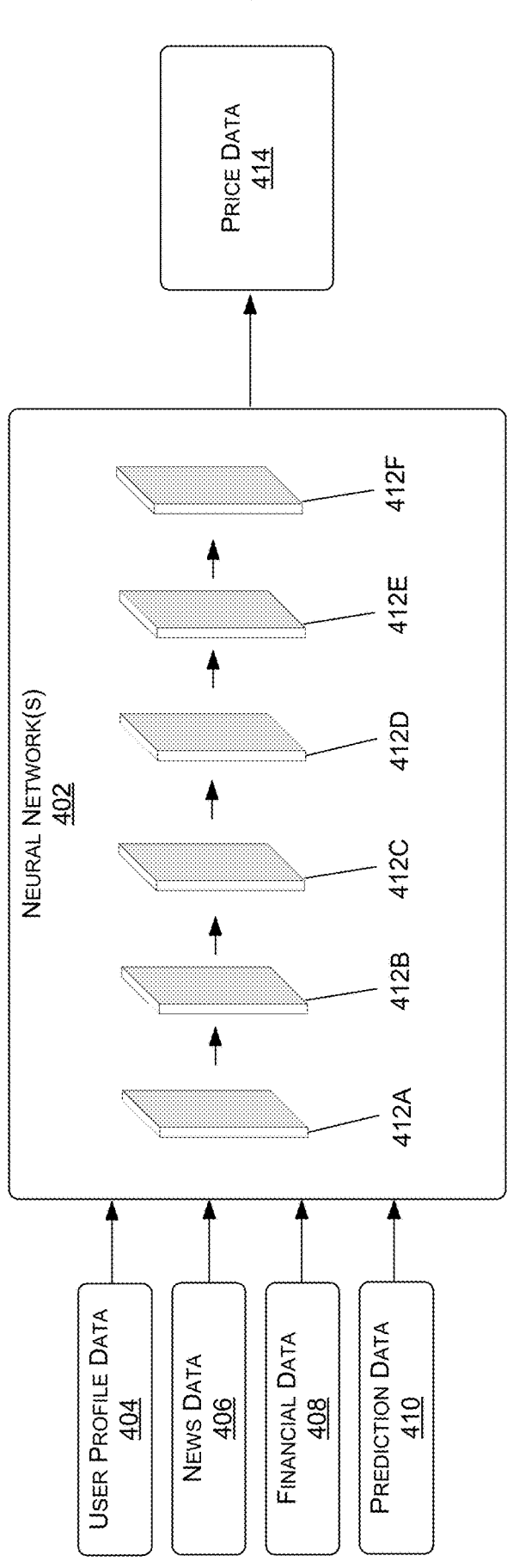
FIG. 4A-4B illustrate example neural networks for predicting future prices associated with investments, in accordance with some embodiments of the present disclosure.

For instance, FIG. 4A illustrates a first example of a neural network(s) 402 (which may be included as part of the investment price component 132) for predicting future prices associated with investments, in accordance with some embodiments of the present disclosure. The neural network(s) 402 may be one example of a machine learning model that may be used to perform one or more of the processes described herein.

As described herein, the neural network(s) 402 may use user profile data 404, news data 406, financial data 408, and/or prediction data 410 (which may respectively represent, and/or include, at least a portion of the user profile data 110, news data 112, financial data 114, and/or prediction data 116) as an input. As described herein, the user profile data 404 may represent an identifier of a user, an age of the user, an investment(s) that the user has acquired, an investment(s) that the user has sold, one or more previous inquiries from the user, an investment(s) that the user is interested in, a topic(s) that the user is interested in, an emotion(s) associated with the user, a career of the user, a salary of the user, and/or any other information associated with the user. The news data 406 may represent financial news (e.g., news articles, opinion articles, etc.), product news (e.g., product release news), investment news (e.g., a stock buyback, a stock offering, etc.), and/or any other type of news that may impact the values of investments. Additionally, the financial data 408 may represent previous prices and/or current pries associated with the investments at various times. Finally, the prediction data 410 may represent historical financial predictions for investments, such as predicted prices and/or predicted price ranges for investments from financial professionals.

The user profile data 404, the news data 406, the financial data 408, and/or the prediction data 410 may be input into layer(s) 412 of the neural network(s) 402. The layer(s) 412 may include any number of layers 412, such as the layers 412A-412F. One or more of the layers 412 may include an input layer. The input layer may hold values associated with the user profile data 404, the news data 406, the financial data 408, and/or the prediction data 410.

One or more layers 412 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 412 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 412 may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the neural network(s) 402 may not include any pooling layers. In such examples, other types of convolution layers may be used in place of pooling layers. In some examples, the layer(s) 412 may include alternating convolutional layers and pooling layers.

One or more of the layers 412 may include a fully connected layer. Each neuron in the fully connected layer(s) may be connected to each of the neurons in the previous volume. The fully connected layer may compute movement scores, and the resulting volume may be 1×1×N (where N is a number of movements). In some examples, the layer(s) 412 may include a fully connected layer, while in other examples, the fully connected layer of the neural network(s) 402 may be the fully connected layer separate from the layer(s) 412. In some examples, no fully connected layers may be used by the layer(s) 412 and/or the neural network(s) 402 as a whole, in an effort to increase processing times and reduce computing resource requirements. In such examples, where no fully connected layers are used, the neural network(s) 402 may be referred to as a fully convolutional network.

One or more of the layers 412 may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer.

Although input layers, convolutional layers, pooling layers, ReLU layers, deconvolutional layers, and fully connected layers are discussed herein with respect to the layer(s) 412, this is not intended to be limiting. For example, additional or alternative layers 412 may be used, such as normalization layers, SoftMax layers, attention layers, recurrent layers, embedding layers, filtering layers, output layers, and/or other layer types.

In some examples, some of the layers 412 may include parameters (e.g., weights and/or biases) while others may not. In some examples, the parameters may be learned by the neural network(s) 402 during training. Further, some of the layers 412 may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent, exponential linear unit (ELU), etc. The parameters, hyper-parameters, and/or activation functions are not to be limited and may differ depending on the embodiment.

In any example, the neural network(s) 402 may output price data 414 representing one or more future predicted prices for an investment(s). In some examples, the price data 414 represents a plurality of future predicted prices at various time intervals, such as a respective predicted price at every future minute, every future fifteen minutes, every future thirty minutes, every future hour, every future day, every future week, and/or any other time interval. The various time intervals may be within a threshold time period, such as, but not limited to, one day, one week, one month, one year, and/or any other period of time. In some examples, and as will be described in more detail with respect to FIG. 4B, the time intervals and/or the threshold time period associated with the future predicted prices may correspond to the time intervals and/or the threshold time period associated with the prices of the investment represented by the financial data 408.

Figure 4B:
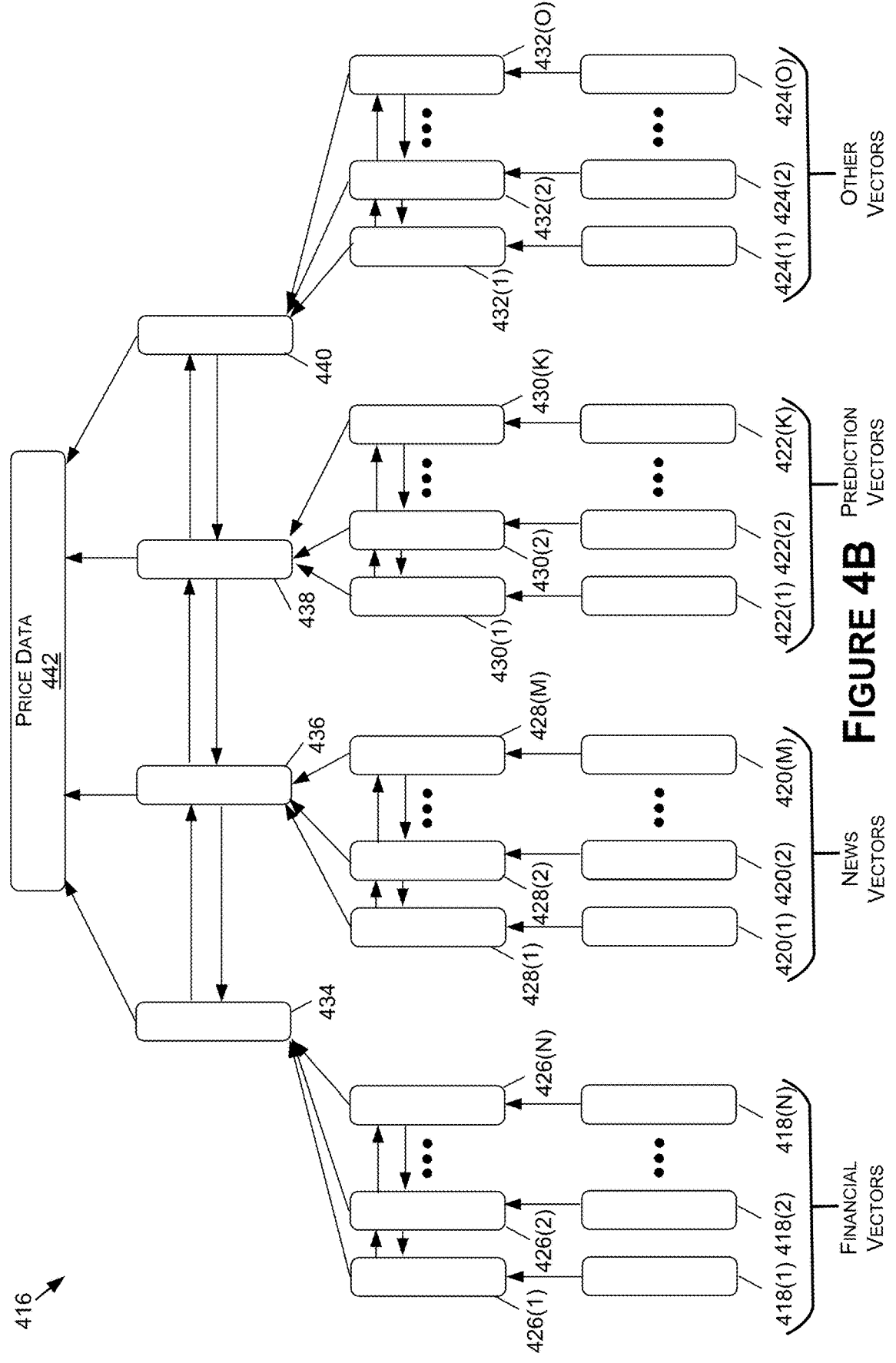

FIG. 4B illustrates a second example of a neural network(s) 416 (which may be included as part of the investment price component 132) (which may represent, and/or include, the neural network(s) 402) for predicting future prices associated with investments, in accordance with some embodiments of the present disclosure. As shown, one or more inputs layers of the neural network(s) 416 may receive and/or generate vectors, such as financial vectors 418(1)-(N) (also referred to singularly as "financial vector 418" or in plural as "financial vectors 418"), news vectors 420(1)-(M) (also referred to singularly as "news vector 420" or in plural as "news vectors 420"), prediction vectors 422(1)-(K) (also referred to singularly as "prediction vector 422" or in plural as "prediction vectors 422"), and/or other input vectors 424(1)-(O) (also referred to singularly as "other input vector 424" or in plural as "other input vectors 424").

The financial vectors 418 may represent one or more past prices associated with an investment being analyzed by the neural network(s) 416 (e.g., each financial vector 418 may represent one past price, two past prices, five past prices, etc.). In some examples, the financial vectors 418 may represent the prices using time intervals, such as every fifteen minutes, every thirty minutes, every hour, every day, every week, every month, every year, and/or any other time interval. For example, if the time interval is fifteen minutes, then a first financial vector 418 may represent a first price of the investment at a current time, a second financial vector 418 may represent a second price of the investment fifteen minutes before the current time, a third financial vector 418 may represent a third price of the investment thirty minutes before the current time, a fourth financial vector 418 may represent a fourth price of the investment forty-five minutes before the current time, a fifth financial vector 418 may represent a fifth price of the investment an hour before the current time, and/or so forth. In some examples, the financial vectors 418 are associated with a first time period. The first time period may include, but is not limited to, one day, one week, one month, one year, and/or any other period of time.

For example, if the time interval is fifteen minutes and the first time period is one hour, then there may be five financial vectors 418 input into neural network(s) 416 (the first financial vector 418 through the fifth financial vector 418 from the example above). In such an example, the financial vectors 418 may be updated for processing using the neural network(s) 416 based on the time interval. For instance, and using the example above where the time interval is fifteen minutes and the first time period is one hour, after an elapse of fifteen minutes, the fifth financial vector 418 (e.g., the vector representing the oldest price of the investment) may be removed from the inputs and a sixth financial vector 418 representing the new current price of the investment may be generated and used as an input. In other words, the inputs to the neural network(s) 416 may include a rolling window of the financial vectors 418.

The news vectors 420 may represent financial news events (e.g., which, in some examples, may be similar to the events 216), emotions, facts, and/or the like associated with the investment. For example, each news vector 420 may represent a respective news event associated with the investment. In some examples, the news vectors 420 may be associated with a second time period. The second time period may include, but is not limited to, one day, one week, one month, one year, and/or any other period of time. In some examples, the second time period associated with the news vectors 420 may be the same as the first time period associated with the financial vectors 418. In other examples, the second time period associated with the news vectors 420 may be different than the first time period associated with the financial vectors 418.

The prediction vectors 422 may represent one or more predicted prices associated with the investment (e.g., each prediction vector 422 may represent one predicted price, two predicted prices, five predicted prices, etc.). For example, the prediction vectors 422 may represent the historical predicted price(s) and/or the future predicted price(s) represented by the prediction data 410. In some examples, the predicted price(s) are from one or more financial professionals, such as financial investment professionals or financial news professionals. In some examples, the predicted vectors 422 are associated with a third time period. The third time period may include, but is not limited to, one day, one week, one month, one year, and/or any other period of time. In some examples, the third time period associated with the prediction vectors 422 may be the same as the second time period associated with the news vectors 420 and the first time period associated with the financial vectors 418. In other examples, the third time period associated with the prediction vectors 422 may be different than the second time period associated with the news vectors 420 and/or the first time period associated with the financial vectors 418.

The other vector(s) 424 may represent one or more past prices, one or more predicted prices, one or more financial events, one or more emotions, and/or the like associated with one or more other investments that may have an impact on the investment. For instance, the other investment(s) may include an investment in the same field (e.g., same business field, technology field, etc.) as the investment, an investment that is the same type (e.g., stock, bond, mutual fund, etc.) as the investment, an investment that is associated with an entity that is related to (e.g., a competitor of, a partner of, etc.) an entity of the investment, and/or the like. In some examples, the other vectors 424 may be associated with a fourth time period. The fourth time period may include, but is not limited to, one day, one week, one month, one year, and/or any other period of time. In some examples, the fourth time period associated with the other vectors 424 may be the same as the third time period associated with the prediction vectors 422, the second time period associated with the news vectors 420, and the first time period associated with the financial vectors 418. In other examples, the fourth time period associated with the other vectors 424 may be different than the third time period associated with the prediction vectors 422, the second time period associated with the news vectors 420, and/or the first time period associated with the financial vectors 418.

As also shown by the example of FIG. 1, the neural network(s) 110 may include one or more second layers, where the second layer(s) may include a single-modal RNN layer. In some examples, the second layer(s) may be configured to generate embeddings for the inputs (e.g., the vectors 418-424) into vectors. For example, the second layer(s) may embed the financial vectors 418 into vectors 426(1)-(N) (also referred to singularly as "vector 426" or in plural as "vectors 426"), embed the news vectors 420 into vectors 428(1)-(M) (also referred to singularly as "vector 428" or in plural as "vectors 428"), embed the prediction vectors 422 into vectors 430(1)-(K) (also referred to singularly as "vector 430" or in plural as "vectors 430"), and embed the vectors 424 into vectors 432(1)-ON) (also referred to singularly as "vector 432" or in plural as "vectors 432").

The neural network(s) 416 may further include one or more third layers, where the third layer(s) may also include an RNN layer. In some examples, the third layer(s) may be configured to obtain the dense vector representations of the vectors 426-432, where the dense vector representation is illustrated as vectors 434-440. For example, the third layer(s) may generate a dense vector representation of the vectors 426, which includes the vector 434, generate a dense vector representation of the vectors 428, which includes the vector 436, generate a dense vector representation of the vectors 430, which includes the vector 438, and generate a dense vector representation of the vectors 432, which includes the vector 440.

The neural network(s) 416 may further include one or more fourth layers that are configured to determine one or more future predicted prices associated with the investment, where the future predicted price(s) are represented by price data 442 (which may represent, and/or include, the price data 414). As described herein, the price data 442 may represent a plurality of future predicted prices at various time intervals, such as a respective future predicted price at every future minute, every future fifteen minutes, every future thirty minutes, every future hour, every future day, every future week, and/or any other time interval. The various time intervals may be over a fifth time period, such as, but not limited to, one day, one week, one month, one year, and/or any other period of time. In some examples, the time intervals and/or the fifth time period associated with the future predicted prices may correspond to the time intervals and/or the first time period associated with the financial vectors 418.

For instance, and using the example above, if the time interval associated with the financial vectors 418 is fifteen minutes and the first time period is one hour, then a first financial vector 418 may represent a first price of the investment at a current time, a second financial vector 418 may represent a second price of the investment fifteen minutes before the current time, a third financial vector 418 may represent a third price of the investment thirty minutes before the current time, a fourth financial vector 418 may represent a fourth price of the investment forty-five minutes before the current time, and a fifth financial vector 418 may represent a fifth price of the investment an hour before the current time. Additionally, the price data 442 may represent a first future predicted price fifteen minutes into the future, a second future predicted price thirty minutes into the future, a third future predicted price forty-five minutes into the future, a fourth future predicted price one hour into the future, and a fifth future predicted price one hour and fifteen minutes into the future.

For an example of the processing of the neural network(s) 416, the input layer(s) may include a group of vectors, where each vector $x_t$ may include a word2vec style embedding of the input multi-modal information. Additionally, it may be supposed that there are a given number of samples (e.g., n1, n2, n3, etc.) in each vector type. As such, one vector $h_{t+1}$ in the second layer(s) (e.g., the first recurrent layer) is computed by first linear combining $h_t$ and $x_t$ and then attaching an elementwise non-linear transformation function. Additionally, T may be set as the number of steps to unroll the second layer(s) and $h_T$ may be the final vector to be used by the fourth layer(s). In some examples, the recurrent operation is performed in two directions, such as from left-to-right and from right-to-left. As such, the concatenation of the two direction vectors forms $h_T$. That is $h_T=[h_{left-to-right}, h_{right-to-left}]^T$.

The third layer(s) may include a bi-directional RNN layer taking $h_T$ from a former layer(s) as inputs. As such, $$h_n^2$$

may denote the output of the third layer(s) where m is the number of users in the input session. The fourth layer(s) may then determine a regression score of the target investment. In some examples, the regression score is computed by y which is a linear function of $$h_n^2$$

and another nonlinear function may be used to project y into a real-value space. For error back propagation, less square error loss may be used, where the less square error loss may correspond to the minimum distance between the future predicted price and the actual price of the investment.

In some examples, the gradient vanishes as T grows bigger and bigger. That is, gradients in (0,1) from $h_T$ back to $h_1$ will gradually get close to zero making the SGC-style updating of parameters infeasible. In some examples, to fix the problem, other types of functions for expressing $h_{t+1}$ using $h_t$ and $x_t$ may be used. For example, augmenting the traditional RNN with a memory cell vector $c_t \in \mathbb{R}^n$ at each time step may be used. In some examples, the LSTM takes as input $x_t$ and $c_t$ as the following calculations:

$$i_t = \sigma\left(W^i x_t + U^i h_{t-1} + b^i\right) \tag{10}$$

$$f_t = \sigma\left(W^f x_t + U^f h_{t-1} + b^f\right) \tag{11}$$

$$o_t = \sigma(W^o x_t + U^o h_{t-1} + b^o) \tag{12}$$

$$g_t = \tanh(W^g x_t + U^g h_{t-1} + b^g) \tag{13}$$

$$c_t = f_t \otimes c_{t-1} + i_t \otimes g_t \tag{14}$$

$$h_t = o_t \otimes \tanh c_t \tag{15}$$

In equations (10)-(15), $\sigma(.)$ and $\tanh(.)$ are the element-wise sigmoid and hyperbolic tangent functions, $\otimes$ is the element-wise multiplication operation, and $i_t$, $f_t$, and $o_t$ respectively denote input, forget, and output gates. As such, when t=1, $h_o$ and $c_0$ are initialized to be zero vectors. Parameters of the LSTM layer(s) that are to be trained include $W^i$, and $U^i$, and the bias vector $b^i$ for $j \in \{i, f, o, g\}$.

Figure 4C:
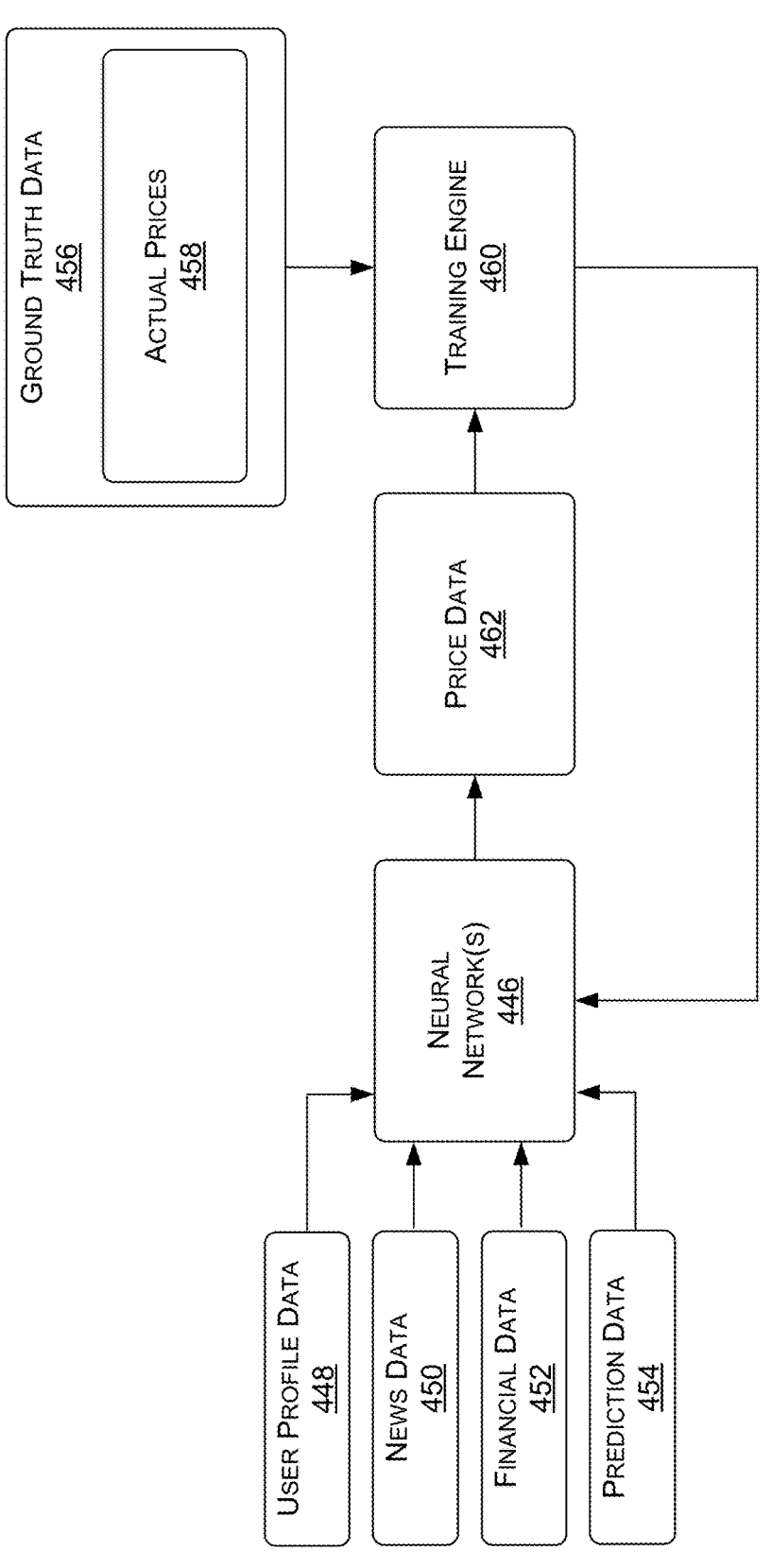
FIG. 4C is a data flow diagram illustrating a process for training a neural network(s) to predict future prices associated with investments, in accordance with some embodiments of the present disclosure.

Now referring to FIG. 4C, FIG. 4C is a data flow diagram illustrating a process 444 for training a neural network(s) 446 (which may represent, and/or include, the neural network(s) 402 and/or the neural network(s) 416) to determine a future predicted price(s) associated with an investment, in accordance with some embodiments of the present disclosure. As shown, the neural network(s) 446 may be trained using user profile data 448, news data 450, financial data 452, and/or prediction data 454 (e.g., training data) (which may respectively represent, and/or include, the user profile data 110, the news data 112, the financial data 114, and/or the prediction data 116).

The neural network(s) 446 may be trained using the training data 448-454 as well as corresponding ground truth data 456. The ground truth data 456 may include annotations, labels, masks, and/or the like. For example, in some embodiments, the ground truth data 456 may include actual prices 458 associated with the investment. In some examples, the actual prices 458 may be at the same time interval and/or the fifth time period associated with the future predicted prices represented by the price data 414 and/or the future predicted prices represented by the price data 442. For example, the ground truth data may include historical price information, and historical news/events/predictions/user profile data/etc. may be used to train the model for future predictions. In such an example, the historical price information may be treated as future predictions when used as ground truth.

The ground truth data 456 may be generated within a drawing program (e.g., an annotation program), a computer aided design (CAD) program, a labeling program, another type of program suitable for generating the ground truth data 456, and/or may be hand drawn, in some examples. In any example, the ground truth data 456 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer).

A training engine 460 may use one or more loss functions that measure loss (e.g., error) in price data 462 output by the neural network(s) 446 as compared to the ground truth data 456. As described herein, the price data 462 may represent one or more future predicted prices for the investment, similar to the price data 414 and/or the price data 442. Any type of loss function may be used, such as cross entropy loss, mean squared error, mean absolute error, mean bias error, and/or other loss function types. In some examples, backward pass computations may be performed to recursively compute gradients of the loss function(s) with respect to training parameters. In some examples, weight and biases of the neural network(s) 446 may be used to compute these gradients, such as by using the processes described above.

Referring back to the example of FIG. 1, the investment price component 132 may send price data 136 (which may represent, and/or include, the price data 414 and/or the price data 442) to the interactive component 102, the investment movement component 126, and/or the investment product component 130.

The interactive component 102 may then send, to the user device 106, the movement data 128, the product data 134, and/or the price data 136, which may also be represented by 124. In some examples, such as when the interactive component 102 includes a dialogue system, the interactive component 102 may generate audio data representing the financial predictions represented by the movement data 128, the product data 134, and/or the price data 136. The interactive component 102 may then send the audio data to the user device 106, which is represented by 124. This way, the user device 106 may output sound represented by the audio data to the user. In some examples, the interactive component 102 may generate other types of data, such as image data representing content describing the financial predictions. The interactive component 102 may then send the other types of data to the user device 106, which is also represented by 124.

Figure 5:
FIG. 5 illustrates an example financial prediction output that may be provided to users, in accordance with some embodiments of the present disclosure.

For instance, FIG. 5 illustrates an example output 502 that may be provided to a user, in accordance with some embodiments of the present disclosure. As shown, the output 502 may include a graph indicating a price 504 of an investment over a future period of time 506. The graph may indicate a current price 506 of the investment and future predicted prices 510(1)-(7) (also referred to singularly as "future predicted price 510" or in plural as "future predicted prices 510"). For instance, the graph indicates a first future predicted price 510(1) at a first future time T(1), a second future predicted price 510(2) at a second future time T(2), a third future predicted price 510(3) at a third future time T(3), and/or so forth. In some examples, the graph determines the future predicted prices 510 at given time intervals. For example, the times T(1)-T(7) may each indicate fifteen minute time intervals, thirty minute time intervals, hour time intervals, day time intervals, week time intervals, and/or the like.

The graph may further include indicators 512(1)-(7) (also referred to singularly as "indicator 512" or in plural as "indicators 512") that indicate the predicted movement of the price of the investment. For instance, the first indicator 512(1) indicates an upward movement of the price at the current time T(0), the second indicator 512(2) indicates an upward movement of the price at the first future time T(1), the third indicator 512(3) indicates a downward movement of the price at the second future time T(2), the fourth indicator 512(4) indicates an upward movement of price at the third future time T(3), and/or so forth. While the indicators 512 in the example of FIG. 5 include arrows, in other examples, the indicators 512 may include any other type of indicator. Additionally, while the indicators 512 in the example of FIG. 5 indicate downward movements and upward movements, in other examples, the indicators 512 may indicate other types of movements. For example, the indicators 512 may indicate extremely down, down, preserved (no significant change), up, extremely up, and/or the like.

In the example of FIG. 5, the predicted movements are similar to the future predicted prices 510. For instance, the first predicted movement associated with the current time T(0) includes an upward movement and the first future predicted price 510(1) is higher than the current price 506. Additionally, the second predicted movement associated with the first future time T(1) includes an upward movement and the second future predicted price 510(2) is higher than the first future predicted price 510(1). While the example of FIG. 5 illustrates the predicted movements being similar to the future predicted prices 510, in other examples, one or more of the predicted movements may be different than one or more of the future predicted prices 510 (e.g., a predicted movement may include a downward movement while a future predicted price may include a higher price).

In the example of FIG. 5, the output 502 may also include a list of events 514 that caused the predicted movement and/or the future predicted prices. While the example of FIG. 5 includes three events 514, in other examples, the output 502 may include any other number of events 514. Additionally, in some examples, one or more of the events 514 may be associated with one or more weights, such as one or more of the weights 218. This way, the user is able to determine what events 514 caused the greatest impact to the predicted movement and/or the future predicted prices 608.

Now referring to FIGS. 6-8, each block of methods 600, 700, and 800, described herein, comprises a computing process that may be performed using any combination of hardware, firmware, and/or software. For instance, various functions may be carried out by a processor executing instructions stored in memory. The methods 600, 700, and 800 may also be embodied as computer-usable instructions stored on computer storage media. The methods 600, 700, and 800 may be provided by a standalone application, a service or hosted service (standalone or in combination with another hosted service), or a plug-in to another product, to name a few. In addition, the methods 600, 700, and 800 are described, by way of example, with respect to FIG. 1. However, these methods 600, 700, and 800 may additionally or alternatively be executed by any one system, or any combination of systems, including, but not limited to, those described herein.

FIG. 6 is a flow diagram showing a method 600 for predicting movements of an investment, in accordance with some embodiments of the present disclosure. The method 600, at block B602, may include obtaining news data representative of one or more financial events associated with an investment and one or more sources associated with the one or more financial events. For instance, the investment movement component 126 may receive the news data 112. As described herein, the news data 112 may represent financial news (e.g., news articles, opinion articles, etc.), product news (e.g., product release news), investment news (e.g., a stock buyback, a stock offering, etc.), market news, company news, industry news, and/or any other type of news that may impact the values of investments.

At block B604, the process 600 may include inputting the news data into one or more neural networks, the one or more neural networks including one or more weights associated with one or more parameters. For instance, the investment movement component 126 may input the news data 112 (e.g., event(s)) into the neural network(s) (e.g., the neural network(s) 202, the neural network(s) 210, etc.). The neural network(s) may include the weight(s) associated with the parameter(s), such as a first weight(s) associated with the event(s), a second weight(s) associated with the source(s), a third weight(s) associated with time period(s), and/or the like. In some examples, the neural network(s) determines the weight(s) during training.

At block B606, the process 600 may include determining, using the one or more neural networks and based at least on the news data, a predicted movement associated with an investment. For instance, the investment movement component 126 may use the neural network(s) to determine the predicted movement. As described herein, the predicted movement may include, but is not limited to, extremely down, down, preserved (no significant change), up, extremely up, and/or the like. In some examples, the investment movement component 126 may further use the neural network(s) to determine one or more events (e.g., a threshold number of events) that most impacted the predicted movement of the investment.

FIG. 7 is a flow diagram showing a method 700 for predicting investments that users may be interested in acquiring, in accordance with some embodiments of the present disclosure. At block B702, the process 700 may include obtaining user profile data associated with a user. For instance, the investment product component 130 may receive the user profile data 110 associated with the user. The user profile data 110 may represent at least the identifier of the user, the age of the user, the investment(s) that the user has acquired, the investment(s) that the user has sold, the one or more previous inquiries from the user, the investment(s) that the user is interested in, the topic(s) that the user is interested in, the emotion(s) associated with the user, a career of the user, a salary of the user, and/or any other information associated with the user.

At block B704, the process 700 may include inputting the user profile data into one or more neural networks. For instance, the investment product component 130 may input the user profile data 110 into the neural network(s) (e.g., the neural network(s) 302, the neural network(s) 310, etc.). In some examples, the neural network(s) includes one or more input layers that receive and/or generate vectors associated with the user profile data 110. For instance, the neural network(s) may receive and/or generate a user vector representing an identity of the user, a product vector representing a target investment(s) associated with the user, a topic/interest vector representing a topic(s) and/or an interest(s) associated with the user, and/or an emotion vector representing an emotion(s) associated with the user.

At block B706, the process 700 may include determining, using the one or more neural networks and based at least on the user profile data, one or more investments that the user may be interested in. For instance, the investment product component 130 may use the neural network(s) to determine the investment(s). In some examples, the neural network(s) determines a score(s) associated with the investment(s), where the score(s) indicates whether the user will be interested in the investment(s). For example, a score of 1 may indicate that a user may be interested in an investment while a score of 0 may indicate that the user may not be interested in the investment.

FIG. 8 is a flow diagram showing a method 800 for predicting future prices associated with an investment, in accordance with some embodiments of the present disclosure. At block B802, the process 800 may include obtaining financial data representative of one or more prices associated with an investment over a period of time. For instance, the investment price component 132 may receive the financial data 114 and/or the prediction data 116 associated with an investment. As described herein, the financial data 114 may represent prices associated with the investments at various times. For example, and for an investment such as a stock, the financial data 114 may represent the prices of the stock at various time intervals, such as every minute, every fifteen minutes, every thirty minutes, every hour, every day, every week, and/or the like. The prediction data 116 may represent historical financial predictions for the investment, such as predicted prices for the investment from financial professionals.

At block B804, the process 800 may include obtaining news data representative of one or more financial events associated with the investment. For instance, the investment price component 132 may receive the news data 112. As described herein, the news data 112 may represent financial news (e.g., news articles, opinion articles, etc.), product news (e.g., product release news), investment news (e.g., a stock buyback, a stock offering, etc.), market news, company news, industry news, and/or any other type of news that may impact the price of the investment.

At block B806, the process 800 may include inputting the financial data and the news data into one or more neural networks. For instance, the investment price component 132 may input the financial data 114, the prediction data 116, and/or the news data 112 into the neural network(s) (e.g., the neural network(s) 402, the neural network(s) 416, etc.). In some examples, the neural network(s) includes one or more input layers that generate a first vector(s) using the financial data 114, a second vector(s) using the news data 112, and/or a third vector(s) using the prediction data 116.

At block B808, the process 800 may include determining, using the one or more neural networks and based at least on the financial data and the news data, one or more predicted prices associated with the investment at one or more future times. For instance, the investment price component 132 may use the neural network(s) to determine the future predicted price(s) associated with the investment.

Example Computing Device

Figure 9:
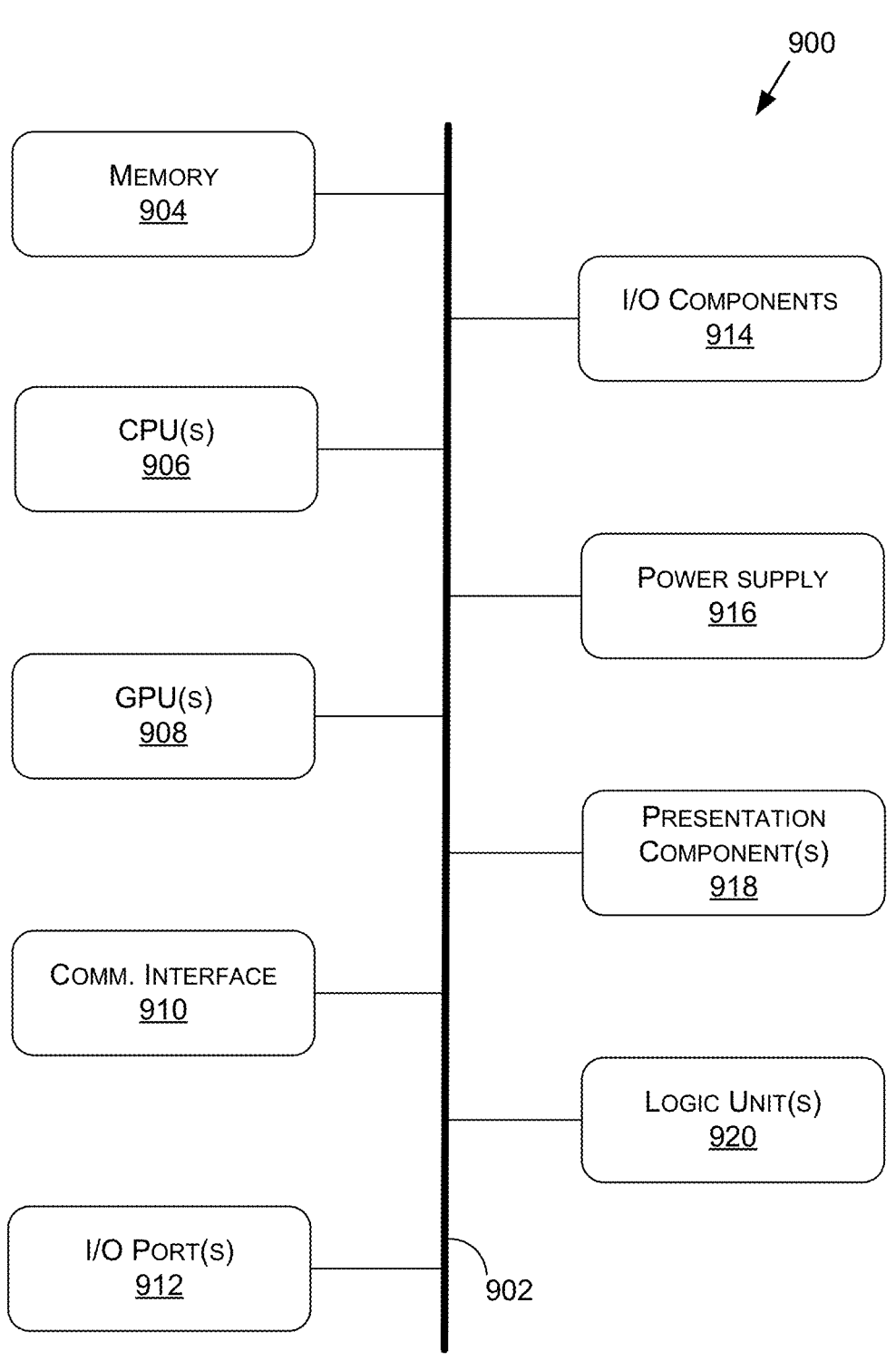
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
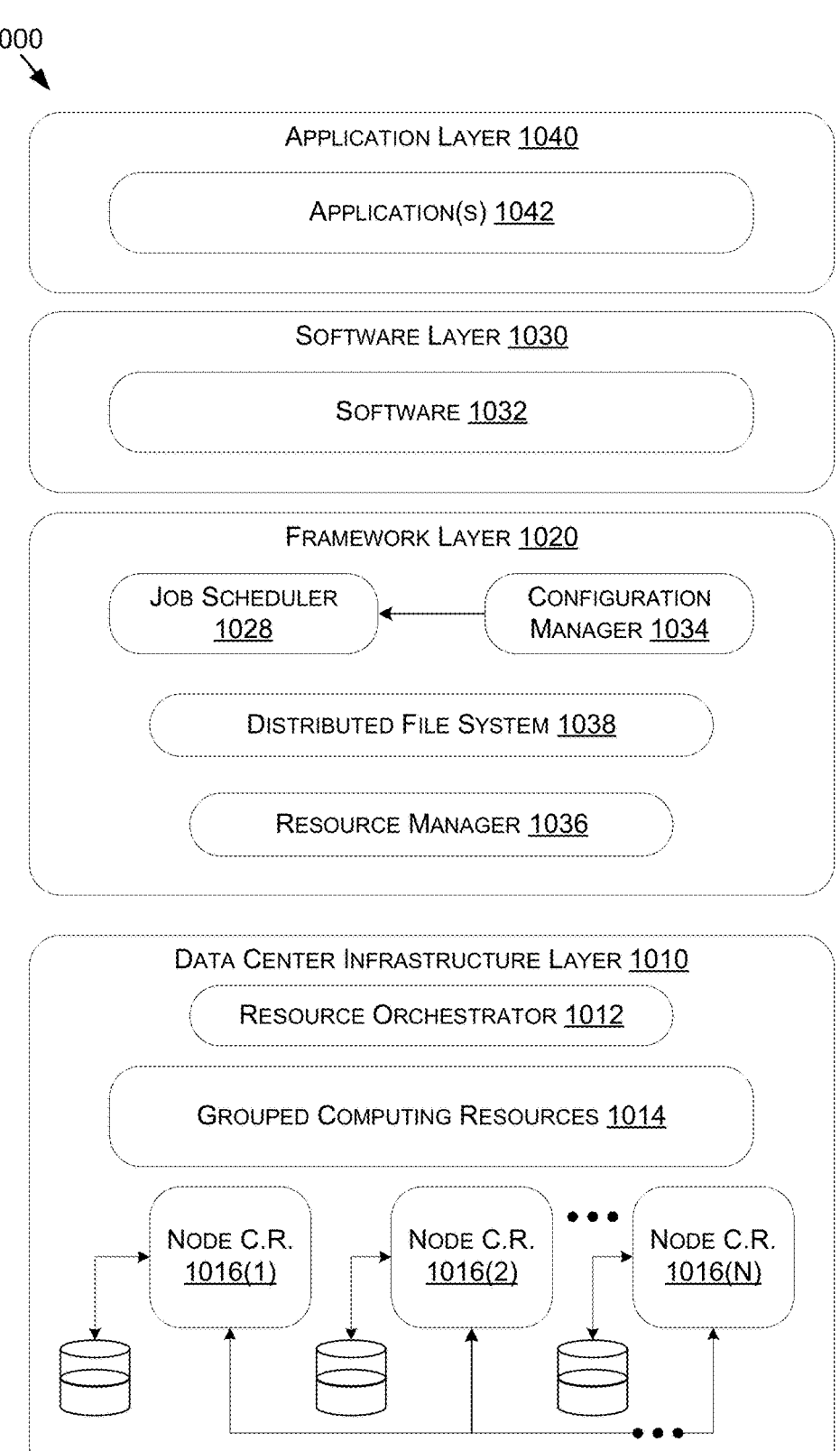
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161 (N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1028, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1028 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1028. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

receiving, from a user device, input data representative of a request for information associated with an investment;

obtaining, based at least on the input data, financial data representative of previous values associated with the investment over a previous time period and event data representative of one or more financial events associated with the investment over the previous time period;

generating, based at least on a neural network processing the financial data using one or more first input layers that are trained to extract values, one or more first vectors associated with the previous values of the investment that are represented using a time interval and over the previous time period;

generating, based at least on the neural network processing the event data using one or more second input layers that are trained to extract one or more event words, one or more second vectors associated with the one or more financial events represented by the event data, the one or more second input layers being different than the one or more first input layers;

generating, based at least on the neural network processing the one or more first vectors and the one or more second vectors using one or more recurrent neural network layers, a first dense vector associated with the one or more first vectors and a second dense vector associated with the one or more second vectors;

generating, based at least on the neural network processing the first dense vector and the second dense vector using one or more subsequent layers that are trained to predict values, output data representative of future values for the investment that is represented using the time interval and over a future time period; and causing an output of at least the future values using the user device.

2. The method of claim 1, further comprising:

obtaining prediction data representative of one or more predicted values associated with the investment; and generating, based at least on the neural network processing the prediction data using one or more third input layers, one or more third vectors associated with the one or more predicted values, wherein the generating the output data representative of the future values associated with the investment is further based at least on the one or more third vectors.

3. The method of claim 1, further comprising:

obtaining second event data representative of one or more second financial events associated with a second investment, the second investment being related to the investment; and generating, based at least on the neural network processing the second event data using the one or more second input layers, one or more third vectors associated with the one or more second financial events, wherein the generating the output data representative of the future values associated with the investment is further based at least on the one or more third vectors.

4. The method of claim 1, wherein:

the financial data is representative of the previous values at individual time intervals of the time interval and within the previous time period.

5. The method of claim 4, wherein:

the future values respectively correspond to the individual time intervals within the future time period.

6. The method of claim 1, further comprising:

obtaining second financial data representative of one or more second previous values associated with the investment over a second previous time period;

obtaining second event data representative of one or more second financial events associated with the investment over the second previous time period; and determining, using the neural network and based at least on the second financial data and the second event data, a second future value associated with the investment.

7. The method of claim 1, wherein the neural network is trained, at least, by:

inputting training data into the neural network, the training data representative of one or more second previous values associated with the investment and one or more second financial events associated with the investment;

determining, using the neural network and based at least on the training data, a second future value associated with the investment;

comparing the second future value associated with the investment to an actual value associated with the investment, the actual value represented by ground truth data; and updating, based at least on the comparing the second future value to the actual value, one or more parameters associated with the neural network.

8. The method of claim 1, further comprising:

determining the investment based at least on one or more of audio data representing user speech associated with the investment or a user profile that is associated with the investment, wherein the user device is associated with at least one of the audio data or the user profile.

9. The method of claim 1, wherein the generating the output data represented of the future values for the investment comprises:

determining, based at least on the neural network processing the first dense vector and the second dense vector using the one or more subsequent layers, one or more regression scores associated with the investment; and generating, using the one or more subsequent layers and based at least on the one or more regression scores, the output data representative of the future values of the investment that are represented using the time interval and over the future time period.

10. The method of claim 1, wherein:

the financial data represents one or more first input vectors corresponding to the previous values; and the event data represents one or more second input vectors corresponding to the one or more financial events.

11. One or more hardware processors comprising processing circuitry to:

receive, from a user device, input data representative of a request for information associated with an investment;

obtain, based at least on the input data, financial data representative of previous values associated with the investment over a previous time period and event data representative of one or more financial events associated with the investment over the previous time period;

generate, based at least on a neural network processing the financial data using one or more first input layers that are trained to extract values, one or more first vectors associated with the previous values of the investment that are represented using a time interval and over the previous time period;

generate, based at least on the neural network processing the event data using one or more second input layers that are trained to extract one or more event words, one or more second vectors associated with the one or more financial events represented by the event data, the one or more second input layers being different than the one or more first input layers;

generate, based at least on the neural network processing the one or more first vectors and the one or more second vectors using one or more recurrent neural network layers, a first dense vector associated with the one or more first vectors and a second dense vector associated with the one or more second vectors;

generate, based at least on the neural network processing the first dense vector and the second dense vector using one or more subsequent layers that are trained to predict values, output data representative of future values for the investment that are represented using the time interval and over a future time period; and cause an output of at least the future values using the user device.

12. The one or more hardware processors of claim 11, wherein the processing circuitry is further to:

obtain prediction data representative of one or more predicted values associated with the investment; and generate, based at least on the neural network processing the prediction data using one or more third input layers, one or more third vectors associated with the one or more predicted values, wherein the output data representative of the future values associated with the investment is further generated based at least on the one or more third vectors.

13. The one or more hardware processors of claim 11, wherein the one or more hardware processors are comprised in at least one of:

a system for performing simulation operations;

a system for performing digital twin operations;

a system for performing deep learning operations;

a system implemented using an edge device;

an infotainment system of an autonomous or semi-autonomous machine;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

14. A system comprising:

one or more processors to:

receive, from a user device, input data representative of a request for information associated with an investment;

obtain, based at least on the input data, financial data representative of previous values associated with the investment over a previous time period and event data representative of one or more financial events associated with the investment over the previous time period;

generate, based at least on a neural network processing the financial data using one or more first input layers that are trained to extract values, one or more first vectors associated with the previous values of the investment that are represented using a time interval and over the previous time period;

generate, based at least on the neural network processing the event data using one or more second input layers that are trained to extract one or more event words, one or more second vectors associated with the one or more financial events represented by the event data, the one or more second input layers being different than the one or more first input layers;

generate, based at least on the neural network processing the one or more first vectors and the one or more second vectors using one or more recurrent neural network layers, a first dense vector associated with the one or more first vectors and a second dense vector associated with the one or more second vectors;

generate, based at least on the neural network processing the first dense vector and the second dense vector using one or more subsequent layers that are trained to predict values, output data representative of future values for the investment that are represented using the time interval and over a future time period; and cause an output of at least the future values using the user device.

15. The system of claim 14, wherein the one or more processors are further to:

obtain prediction data representative of one or more predicted values associated with the investment; and generate, based at least on the neural network processing the prediction data using one or more third input layers, one or more third vectors associated with the one or more predicted values, wherein the output data representative of the future values associated with the investment is further generated based at least on the one or more third vectors.

16. The system of claim 14, wherein the one or more processors are further to:

obtain second event data representative of one or more second financial events associated with a second investment, the second investment being related to the investment; and generate, based at least on the neural network processing the second event data using the one or more second input layers, one or more third vectors associated with the one or more second financial events, wherein the output data representative of the future values associated with the investment is further generated based at least on the one or more third vectors.

17. The system of claim 14, wherein the financial data is representative of the previous values at individual time intervals of the time interval and within the previous time period.

18. The system of claim 14, wherein the one or more processors are further to:

obtain second financial data representative of one or more second previous values associated with the investment over a second previous time period;

obtain second event data representative of one or more second financial events associated with the investment over the second previous time period; and determining, using the neural network and based at least on the second financial data and the second event data, a second future value associated with the investment.

19. The system of claim 14, wherein the neural network is trained, at least, by:

inputting training data into the neural network, the training data representative of one or more second previous values associated with the investment and one or more second financial events associated with the investment;

determining, using the neural network and based at least on the training data, a second future value associated with the investment;

comparing the second future value associated with the investment to an actual value associated with the investment, the actual value represented by ground truth data; and updating, based at least on the comparing the second future value to the actual value, one or more parameters associated with the neural network.

20. The system of claim 14, wherein the system is comprised in at least one of:

a system for performing simulation operations;

a system for performing digital twin operations;

a system for performing deep learning operations;

a system implemented using an edge device;

an infotainment system of an autonomous or semi-autonomous machine;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *